(12) United States Patent
da Veiga

(10) Patent No.: US 11,783,499 B2
(45) Date of Patent: *Oct. 10, 2023

(54) ENABLING AUTOMATIC MEASUREMENTS

(71) Applicant: Apple Inc., Cupertino, CA (US)

(72) Inventor: Alexandre da Veiga, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,640

(22) Filed: Apr. 19, 2021

(65) Prior Publication Data

US 2021/0241477 A1  Aug. 5, 2021

Related U.S. Application Data

(63) Continuation of application No. 16/801,548, filed on Feb. 26, 2020, now Pat. No. 10,984,546.

(60) Provisional application No. 62/812,125, filed on Feb. 28, 2019.

(51) Int. Cl.
*G06T 7/55* (2017.01)
*G06V 20/40* (2022.01)
(52) U.S. Cl.
CPC ............... *G06T 7/55* (2017.01); *G06V 20/46* (2022.01); *G06T 2207/10016* (2013.01)
(58) Field of Classification Search
None
See application file for complete search history.

(56) References Cited

U.S. PATENT DOCUMENTS

| 8,215,774 | B2 | 7/2012 | Korb et al. |
| 9,197,275 | B2 | 11/2015 | Fathollahi et al. |
| 10,599,920 | B2 | 3/2020 | Mojaver |
| 10,803,609 | B2 | 10/2020 | Oka |
| 2009/0138233 | A1* | 5/2009 | Kludas ............ G01S 17/89 702/158 |
| 2009/0293012 | A1 | 11/2009 | Alter et al. |
| 2010/0111370 | A1* | 5/2010 | Black ............ G06V 10/763 705/26.1 |
| 2010/0253907 | A1* | 10/2010 | Korb ............ A61B 3/14 351/206 |

(Continued)

FOREIGN PATENT DOCUMENTS

| CN | 102298533 A | 12/2011 |
| CN | 102573497 A | 7/2012 |

(Continued)

OTHER PUBLICATIONS

Office Action received for Chinese Patent Application No. 202010125845.9, dated Oct. 21, 2021, 15 pages (6 pages of English Translation and 9 pages of Official Copy).

(Continued)

*Primary Examiner* — Reza Aghevli
(74) *Attorney, Agent, or Firm* — DLA Piper LLP (US)

(57) ABSTRACT

In accordance with some embodiments, a technique that enables an electronic device with a camera to automatically gather and generate requisite data from the real-world environment to allow the electronic device to quickly and efficiently determine and provide accurate measurements of physical spaces and/or objects within the real-world environment is described.

30 Claims, 24 Drawing Sheets

(56) References Cited

U.S. PATENT DOCUMENTS

| | | | |
|---|---|---|---|
| 2010/0321490 A1* | 12/2010 | Chen | G01C 11/00 348/118 |
| 2012/0001938 A1* | 1/2012 | Sandberg | G06F 16/9577 345/633 |
| 2012/0019674 A1* | 1/2012 | Ohnishi | G08C 17/00 348/207.1 |
| 2012/0206597 A1* | 8/2012 | Komoto | G06V 20/58 348/135 |
| 2013/0197793 A1 | 8/2013 | Vaddadi et al. | |
| 2013/0201210 A1 | 8/2013 | Vaddadi et al. | |
| 2013/0247117 A1* | 9/2013 | Yamada | H04W 4/029 340/12.5 |
| 2013/0337789 A1* | 12/2013 | Johnson | H04W 4/023 455/414.1 |
| 2014/0132411 A1 | 5/2014 | Buchheim et al. | |
| 2014/0232636 A1* | 8/2014 | Hara | G06V 40/28 345/156 |
| 2014/0267409 A1 | 9/2014 | Fein et al. | |
| 2014/0267410 A1 | 9/2014 | Fein et al. | |
| 2014/0267411 A1 | 9/2014 | Fein et al. | |
| 2014/0315603 A1 | 10/2014 | Fathollahi et al. | |
| 2015/0084755 A1* | 3/2015 | Chen | G08G 1/16 340/435 |
| 2015/0094118 A1 | 4/2015 | Rodolico | |
| 2016/0072541 A1 | 3/2016 | Fathollahi et al. | |
| 2016/0179454 A1 | 6/2016 | Liu | |
| 2016/0189386 A1* | 6/2016 | Michaelraj | G06T 7/12 382/154 |
| 2016/0203641 A1* | 7/2016 | Bostick | G06T 19/006 345/633 |
| 2016/0330379 A1* | 11/2016 | Lee | H04N 5/23216 |
| 2017/0034431 A1* | 2/2017 | Malgimani | H04N 5/23222 |
| 2017/0148188 A1 | 5/2017 | Fathollahi et al. | |
| 2017/0161561 A1* | 6/2017 | Marty | G06V 20/42 |
| 2018/0075301 A1 | 3/2018 | Everhart | |
| 2018/0211411 A1 | 7/2018 | Fathollahi et al. | |
| 2019/0096135 A1* | 3/2019 | Dal Mutto | G06T 7/0006 |
| 2019/0297313 A1* | 9/2019 | Nolan | H04N 13/189 |
| 2020/0250846 A1* | 8/2020 | Oka | G01C 3/14 |
| 2020/0279386 A1 | 9/2020 | Da Veiga | |
| 2021/0158621 A1 | 5/2021 | Shatkina et al. | |
| 2022/0084374 A1 | 3/2022 | Dour et al. | |
| 2022/0189075 A1 | 6/2022 | Lynch et al. | |

FOREIGN PATENT DOCUMENTS

| | | |
|---|---|---|
| CN | 104094082 A | 10/2014 |
| CN | 104094083 A | 10/2014 |
| CN | 105745122 A | 7/2016 |
| CN | 109144379 A | 1/2019 |
| JP | 2018-40789 A | 3/2018 |
| WO | 2015/039776 A1 | 3/2015 |
| WO | 2017/007643 A1 | 1/2017 |
| WO | 2019/245550 A1 | 12/2019 |

OTHER PUBLICATIONS

Apple Support, "Use the Measure app on your iPhone, iPad, or iPod touch", Online Available at: https://support.apple.com/en-us/HT208924, Apr. 23, 2020, 5 pages.

Caramba Apps,"EasyMeasure—Measure with your Camera!", Online available at: https://www.caramba-apps.com/easymeasure/, Retrieved on Sep. 14, 2020, 5 pages.

Ghazouani Hamza, "A beautiful radar view to show nearby items with ripple animation", Online Available at: https://iosexample.com/a-beautiful-radar-view-to-show-nearby-items-with-ripple-animation/, Dec. 3, 2018, 12 pages.

Applicant-Initiated Interview Summary received for U.S. Appl. No. 16/801,548, dated Nov. 2, 2020, 3 pages.

Non-Final Office Action received for U.S. Appl. No. 16/801,548 dated Sep. 25, 2020, 13 pages.

Notice of Allowance received for U.S. Appl. No. 16/801,548, dated Dec. 9, 2020, 10 pages.

Notice of Allowance received for Chinese Patent Application No. 202010125845.9, dated Oct. 8, 2022, 4 pages (1 page of English Translation and 3 pages of Official Copy).

International Search Report and Written Opinion received for PCT Patent Application No. PCT/US2021/048421, dated Dec. 8, 2021, 15 pages.

Office Action received for Chinese Patent Application No. 202010125845.9, dated Jun. 6, 2022, 10 pages (5 pages of English Translation and 5 pages of Official Copy).

Prajanified, "App which will help you maintain social distancing! How to use Sodar app", Online Available at: https://www.youtube.com/watch?v=kmpyc8SNeX4, Jun. 9, 2020, 3 pages.

Non-Final Office Action received for U.S. Appl. No. 17/398,617, dated Jan. 27, 2023, 11 pages.

* cited by examiner

ENABLING AUTOMATIC MEASUREMENTS

CROSS-REFERENCE TO RELATED APPLICATIONS

This application is a continuation of U.S. patent application Ser. No. 16/801,548, entitled "ENABLING AUTOMATIC MEASUREMENTS," filed Feb. 26, 2020, which claims priority to U.S. Provisional Patent Application Ser. No. 62/812,125, entitled "ENABLING AUTOMATIC MEASUREMENTS," filed Feb. 28, 2019, the contents of which are hereby incorporated by reference in their entirety.

FIELD

The present disclosure relates generally to providing measurements, and more specifically to methods and techniques for enabling automatic measurements using an electronic device.

BACKGROUND

Electronic devices equipped with a camera can be used to provide measurements of real-world distances. However, conventional measurement techniques require instructing the user to follow particular steps in order for the device to gather and process requisite data from the real-world environment to enable the device to determine and provide accurate measurements. As such, conventional measurement techniques can be improved upon to enhance efficiency, thereby enabling devices to conserve more energy, which is of particular importance for battery-operated devices.

BRIEF SUMMARY

Accordingly, there is a need for a more efficient and improved technique providing measurements using an electronic device. The technique provided herein enables an electronic device with a camera, such as smartphone or a wearable device (e.g., a smartwatch or smart glasses), to automatically gather and generate requisite data from the real-world environment to enable the device to quickly and efficiently determine and provide accurate measurements of physical spaces and/or objects within the real-world environment.

In accordance with some embodiments, a method performed at an electronic device with a camera is described. The method comprises: prior to detecting activation of an application for measuring a distance between real-world points on the electronic device, capturing, via the camera, a plurality of images along a path of movement of the electronic device; determining keyframes based on one or more characteristics of the plurality of images; storing the keyframes; and in response to detecting the activation of the application for measuring the distance: determining the distance between real-world points using one or more of the stored keyframes; and displaying, in a user interface of the application, a representation of the distance.

In accordance with some embodiments, a non-transitory computer-readable storage medium is described. The non-transitory computer-readable storage medium stores one or more programs configured to be executed by one or more processors of an electronic device with a camera, the one or more programs including instructions for: prior to detecting activation of an application for measuring a distance between real-world points on the electronic device, capturing, via the camera, a plurality of images along a path of movement of the electronic device; determining keyframes based on one or more characteristics of the plurality of images; storing the keyframes; and in response to detecting the activation of the application for measuring the distance: determining the distance between real-world points using one or more of the stored keyframes; and displaying, in a user interface of the application, a representation of the distance.

In accordance with some embodiments, a transitory computer-readable storage medium is described. The transitory computer-readable storage medium stores one or more programs configured to be executed by one or more processors of an electronic device with a camera, the one or more programs including instructions for: prior to detecting activation of an application for measuring a distance between real-world points on the electronic device, capturing, via the camera, a plurality of images along a path of movement of the electronic device; determining keyframes based on one or more characteristics of the plurality of images; storing the keyframes; and in response to detecting the activation of the application for measuring the distance: determining the distance between real-world points using one or more of the stored keyframes; and displaying, in a user interface of the application, a representation of the distance.

In accordance with some embodiments, an electronic device is described. The electronic device comprises: a camera; one or more processors; and a memory storing one or more programs configured to be executed by the one or more processors, the one or more programs including instructions for: prior to detecting activation of an application for measuring a distance between real-world points on the electronic device, capturing, via the camera, a plurality of images along a path of movement of the electronic device; determining keyframes based on one or more characteristics of the plurality of images; storing the keyframes; and in response to detecting the activation of the application for measuring the distance: determining the distance between real-world points using one or more of the stored keyframes; and displaying, in a user interface of the application, a representation of the distance.

In accordance with some embodiments, an electronic device is described. The electronic device comprises a camera; means, prior to detecting activation of an application for measuring a distance between real-world points on the electronic device, for capturing, via the camera, a plurality of images along a path of movement of the electronic device; means for determining keyframes based on one or more characteristics of the plurality of images; means for storing the keyframes; and means, in response to detecting the activation of the application for measuring the distance, for: determining the distance between real-world points using one or more of the stored keyframes; and displaying, in a user interface of the application, a representation of the distance.

In accordance with some embodiments, a method performed at an electronic device with a camera is described. The method comprises: prior to detecting a request to measure a distance between real-world points using an application on the electronic device, capturing, via the camera, a plurality of images along a path of movement of the electronic device from a first location to a second location, wherein the first location corresponds to a location of the electronic device when the application is activated on the electronic device; determining keyframes based on one or more characteristics of the plurality of images; storing the keyframes; and in response to detecting the request to measure the distance: determining the distance between the real-world points using one or more of the stored keyframes; and displaying, in a user interface of the application, a representation of the distance.

In accordance with some embodiments, a non-transitory computer-readable storage medium is described. The non-transitory computer-readable storage medium stores one or more programs configured to be executed by one or more processors of an electronic device with a camera, the one or more programs including instructions for: prior to detecting a request to measure a distance between real-world points using an application on the electronic device, capturing, via the camera, a plurality of images along a path of movement of the electronic device from a first location to a second location, wherein the first location corresponds to a location of the electronic device when the application is activated on the electronic device; determining keyframes based on one or more characteristics of the plurality of images; storing the keyframes; and in response to detecting the request to measure the distance: determining the distance between the real-world points using one or more of the stored keyframes; and displaying, in a user interface of the application, a representation of the distance.

In accordance with some embodiments, a transitory computer-readable storage medium is described. The transitory computer-readable storage medium stores one or more programs configured to be executed by one or more processors of an electronic device with a camera, the one or more programs including instructions for: prior to detecting a request to measure a distance between real-world points using an application on the electronic device, capturing, via the camera, a plurality of images along a path of movement of the electronic device from a first location to a second location, wherein the first location corresponds to a location of the electronic device when the application is activated on the electronic device; determining keyframes based on one or more characteristics of the plurality of images; storing the keyframes; and in response to detecting the request to measure the distance: determining the distance between the real-world points using one or more of the stored keyframes; and displaying, in a user interface of the application, a representation of the distance.

In accordance with some embodiments, an electronic device is described. The electronic device comprises: a camera; one or more processors; and a memory storing one or more programs configured to be executed by the one or more processors, the one or more programs including instructions for: prior to detecting a request to measure a distance between real-world points using an application on the electronic device, capturing, via the camera, a plurality of images along a path of movement of the electronic device from a first location to a second location, wherein the first location corresponds to a location of the electronic device when the application is activated on the electronic device; determining keyframes based on one or more characteristics of the plurality of images; storing the keyframes; and in response to detecting the request to measure the distance: determining the distance between the real-world points using one or more of the stored keyframes; and displaying, in a user interface of the application, a representation of the distance.

In accordance with some embodiments, an electronic device is described. The electronic device comprises a camera; means, prior to detecting a request to measure a distance between real-world points using an application on the electronic device, for capturing, via the camera, a plurality of images along a path of movement of the electronic device from a first location to a second location, wherein the first location corresponds to a location of the electronic device when the application is activated on the electronic device; means for determining keyframes based on one or more characteristics of the plurality of images; means for storing the keyframes; and means, in response to detecting the request to measure the distance, for: determining the distance between the real-world points using one or more of the stored keyframes; and displaying, in a user interface of the application, a representation of the distance.

BRIEF DESCRIPTION OF THE FIGURES

For a better understanding of the various described embodiments, reference should be made to the Detailed Description below, in conjunction with the following drawings in which like reference numerals refer to corresponding parts throughout the figures.

FIGS. 1A-1G and 2A-2I illustrate an exemplary technique for enabling an electronic device to provide measurements, in accordance with some embodiments.

DETAILED DESCRIPTION

Various techniques for automatically enabling an electronic device with a camera, such as a smartphone or a wearable device, to provide measurements of a real-world environment, and in particular of a physical space and objects therein, are described.

FIGS. 1A-1G illustrate an exemplary technique for enabling an electronic device 100 to provide measurements, in accordance with some embodiments. Electronic device 100 includes a display 102 (e.g., integrated with a touch-sensitive surface) and a camera 104 (e.g., located on the device such that the field-of-view of the camera is pointing away from a user of the device while the device is held by the user in a natural position). In some embodiments, electronic device 100 is a smartphone or tablet computer. In some embodiments, electronic device 100 is a wearable electronic device (e.g., a smartwatch, smart glasses).

Figure 1A:
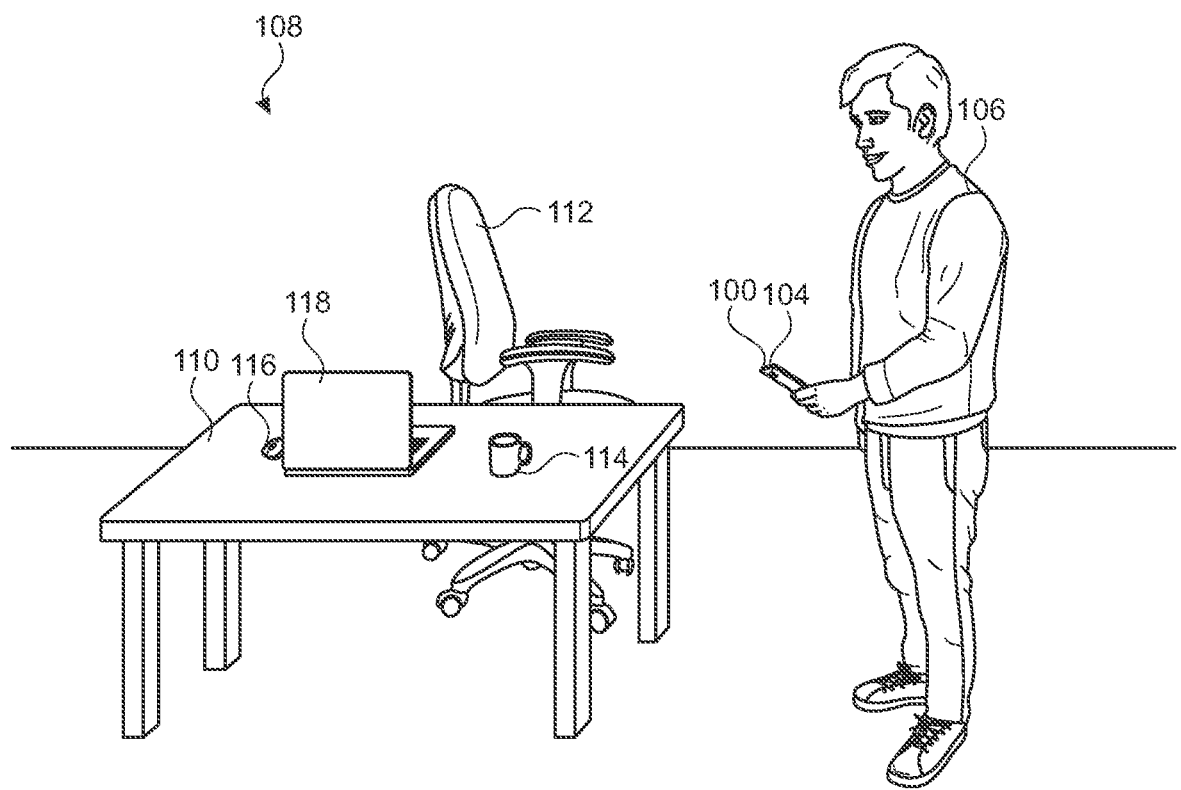

FIG. 1A illustrates a user 106 in a physical location 108 (e.g., a room) holding electronic device 100. Physical location 108 includes a plurality of objects, including an object 110 (e.g., a desk), an object 112 (e.g., a chair), an object 114 (e.g., a mug), an object 116 (e.g., a mouse), and an object 118 (e.g., a laptop computer). While the physical location illustrated in FIGS. 1A-1G is an indoor room, the physical location can be any location within the real-world environment (e.g., an indoor location, an outdoor location) where the user can use the device. In FIG. 1A, user 106 is holding electronic device 100 (e.g., in a natural position such that the user can easily and comfortable view display 102 and navigate contents shown on display 102).

Figure 1B:
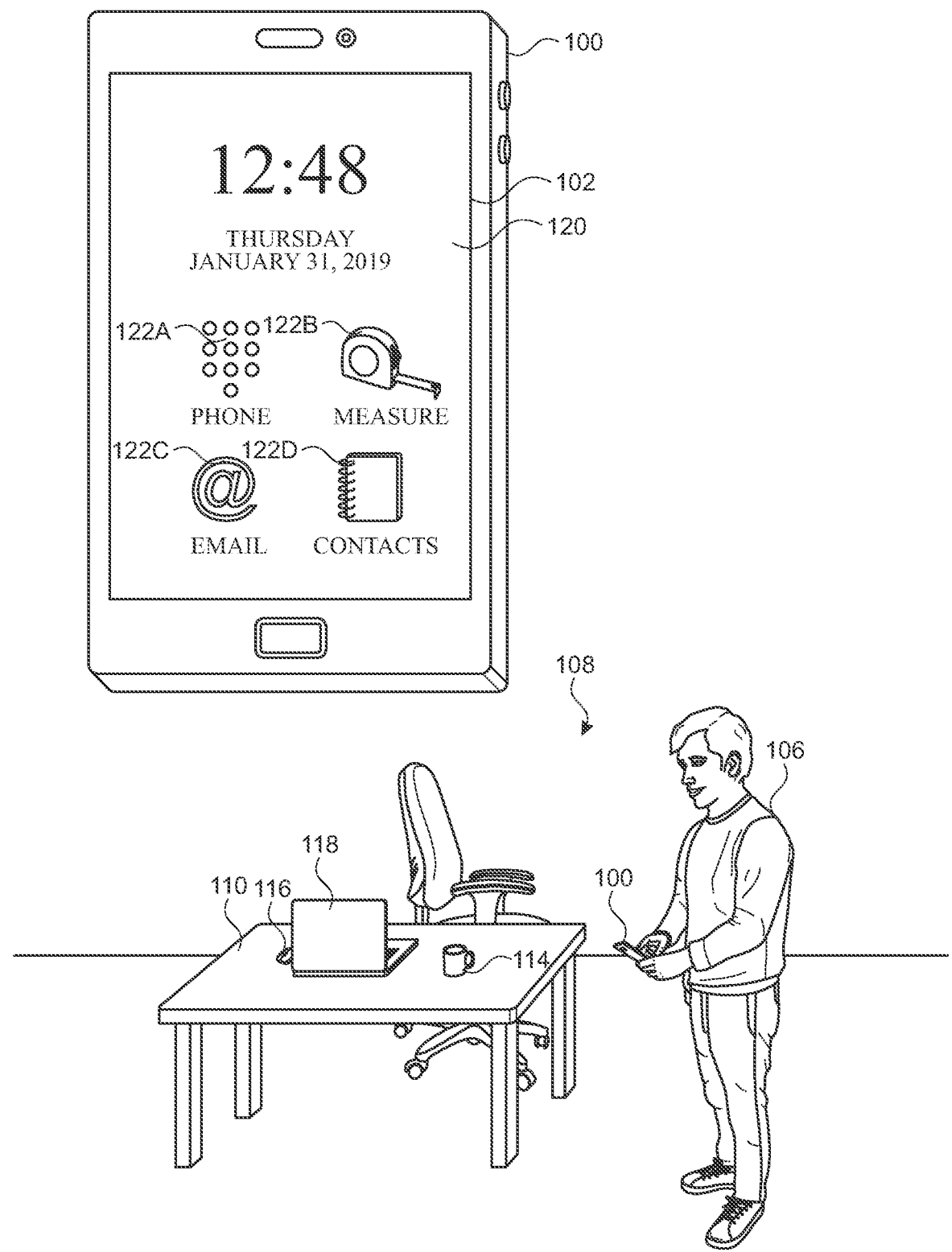

FIG. 1B illustrates electronic device 100 displaying, on display 102, a user interface 120 while user 106 is in physical location 108 and holding the device in the natural position, as first shown in FIG. 1A. As shown in FIG. 1B, user interface 120 is a home user interface that is the main user interface of an operating system of the electronic device, and includes a plurality of application icons 122A-122D corresponding to the various applications installed on the device. In some embodiments, while displaying user interface 120, the operating system of electronic device 100 is executing one or more open applications in the background of the device such that the user interfaces corresponding to these applications are not currently displayed on the display. In other examples, electronic device 100 may be displaying a user interface of a third-party application that is installed on the device (and not a first-party application).

As used herein, the terms "open application" or "executing application" refer to applications with retained state information, and is, optionally, any one of the following three types of applications: (1) an "active application" or an "activated application," which is currently displayed on a display of the device that the application is being used on; (2) a "background application" (or background process), which is not currently displayed, but one or more processes for the application are being processed by one or more processors of the device; and (3) a "suspended application" or "hibernated application," which is not running, but has state information that is stored in memory (volatile or non-volatile) and that can be used to resume execution of the application.

As also used herein, the term "closed application" refers to applications without retained state information (that is, state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

In FIG. 1B, while displaying user interface 120, electronic device 100 detects (e.g., via a touch-sensitive surface of the device) a user selection of an application icon 122B corresponding to an application for measuring distances within the real-world environment. For the sake of simplicity, the application for measuring distances within the real-world environment is hereinafter referred to as the measure application.

Figure 1C:
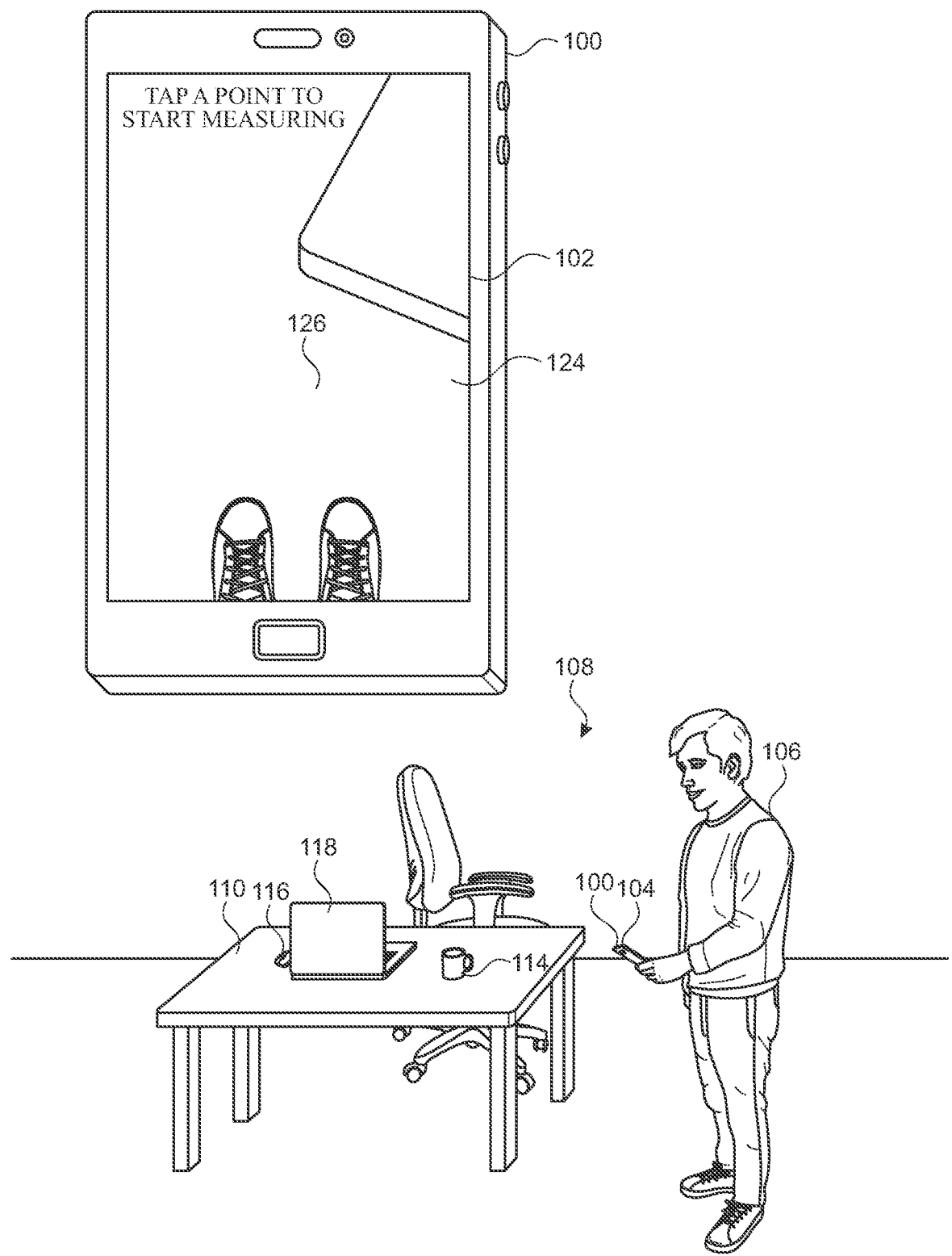

In response to detecting the user selection of application icon 122B corresponding to the measure application, electronic device 100 activates, on the device, the measure application (and, as such, the device displays, on display 102, a user interface of the measure application) to display user interface 124 (FIG. 1C) of the measure application. For example, if the measure application had been closed, then electronic device 100 activates the measure application by opening the measure application and displaying user interface 124 of the measure application. If the measure application had been in the background or suspended, then electronic device 100 activates the measure application by displaying user interface 124 of the measure application. As shown in FIG. 1C, electronic device 100 displays, in user interface 124, a live-feed image 126 of a region of physical location 108, where live-feed image 126 is being captured by camera 104 and corresponds to a region of physical location 108 that is within the field-of-view of camera 104. Further, in some embodiments, in response to detecting the activation of the measure application, electronic device 100 automatically begins capturing (e.g., without providing a feedback to the user such that it is not visible to the user whether the device is capturing), via camera 104, a plurality of images of the region of physical location 108 that is within the field-of-view of camera 104.

Figure 1D:
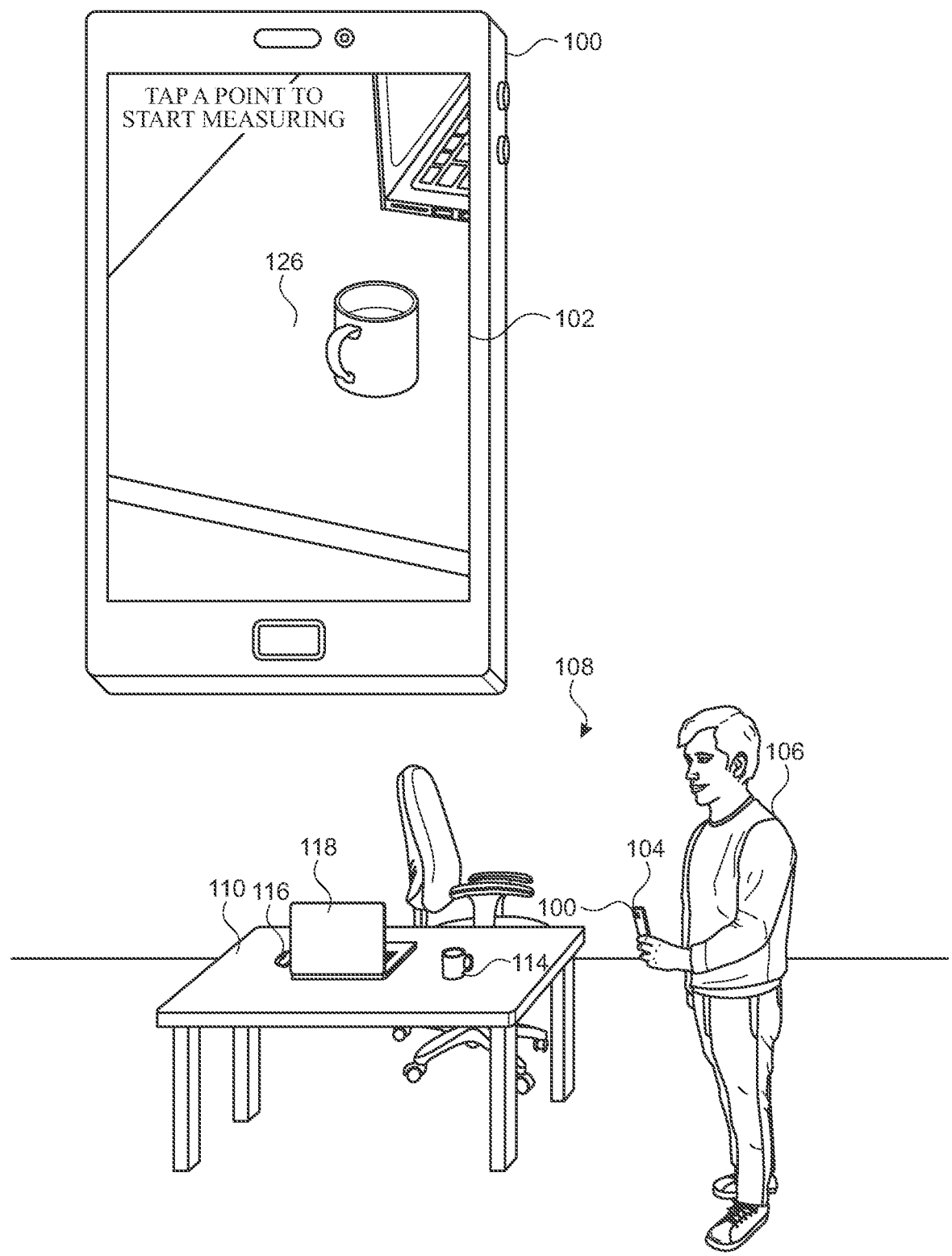
Figure 1E:
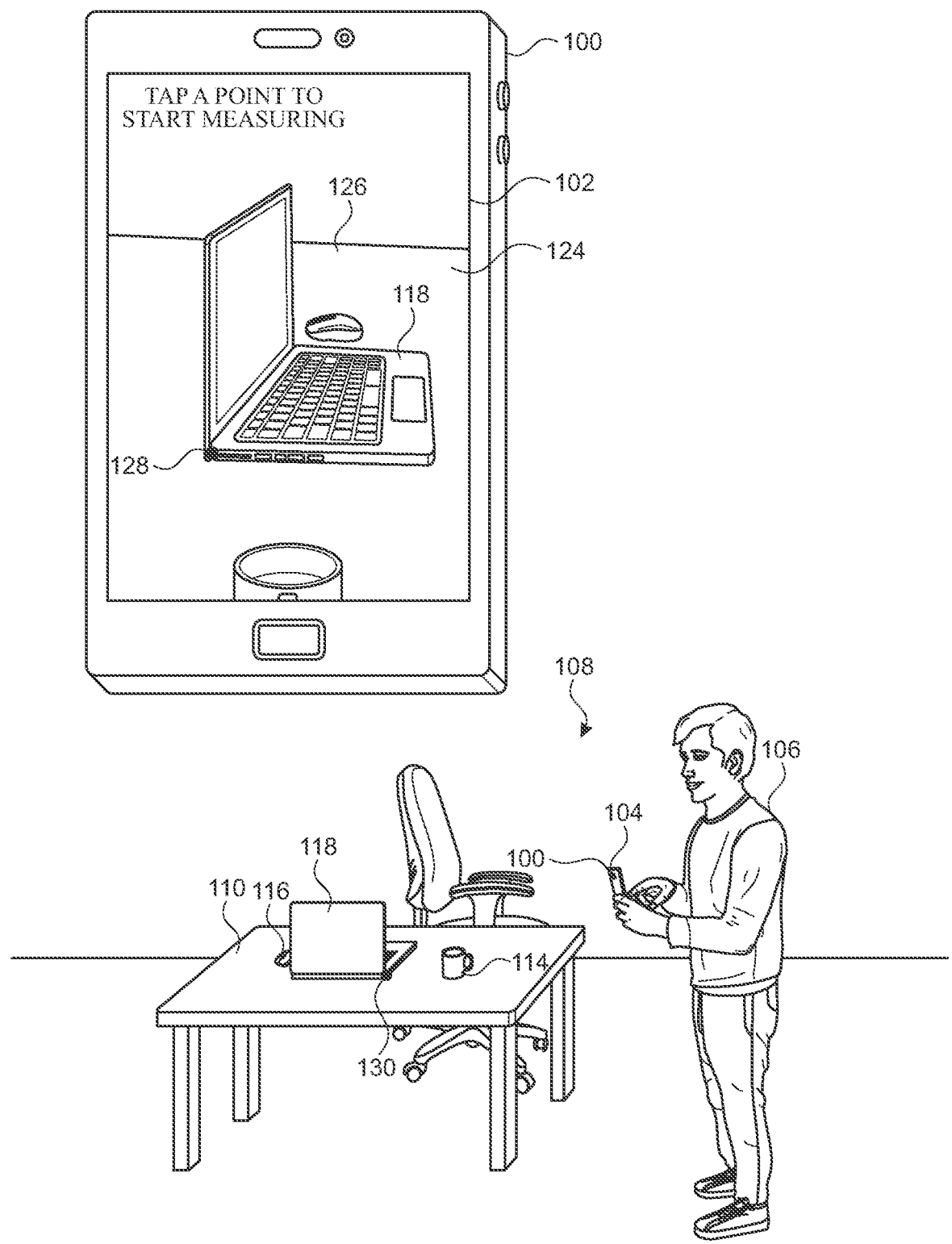

In FIGS. 1C-1E, user 106 moves electronic device 100 from its location in FIG. 1B (when the measure application was activated) to a location in FIG. 1E where object 118 (e.g., a laptop computer) is within the field-of-view of camera 104. During the movement of electronic device 100 in FIGS. 1C-1E, electronic device 100 continues to automatically capture (e.g., without providing a feedback to the user such that it is not visible to the user whether the device is capturing), via camera 104, a plurality of images along the path of movement of the device as the device is moved from its location in FIG. 1B to its location in FIG. 1E by the user.

In response to (e.g., and while) capturing the plurality of images along the path of movement of the device (e.g., the path of movement of the device in FIGS. 1C-1E), electronic device 100 determines (e.g., selects), based on one or more characteristics of the captured images, keyframes from the captured images (e.g., filters the captured images based on one or more characteristics of the images to determine/identify the keyframes). In response to determining the keyframes, electronic device 100 stores (e.g., in a memory buffer) the keyframes (e.g., a predetermined number of keyframes). In some embodiments, if a predefined maximum number of keyframes (e.g., 11 keyframes) are already stored by the device (e.g., in a memory buffer), electronic device 100 replaces the oldest stored keyframe with a new determined keyframe.

In some embodiments, the one or more characteristics used to determine (e.g., select, identify) the keyframes from the captured images include the amount (e.g., distance, angular distance, rotation) of movement of the device (e.g., determined/detected using an accelerometer of the device) between determined keyframes. For example, electronic device 100 selects a first captured image of the plurality of captured images as a first keyframe, and selects a second captured image from the plurality of captured images a second keyframe if the amount of movement of the device between the capturing of the first captured image and the second captured image is at least a predefined amount.

In some embodiments, the one or more characteristics used to determine (e.g., select, identify) the keyframes from the captured images include image quality of the captured images (e.g., whether one or more visually significant attributes of a captured image or the weighted combination of visual significant attributes of a captured image satisfy a certain threshold). For example, electronic device 100 selects a first captured image of the plurality of captured images if the first captured image satisfies an image quality criteria, but forgoes selecting a second captured image of the plurality of captured images if the second captured image fails to satisfy the image quality criteria.

In some embodiments, the one or more characteristics used to determine (e.g., select, identify) the keyframes from the captured images include the brightness/lighting level of the images, where the brightness/lighting level is determined based on data extracted from the captured image. For example, electronic device 100 selects a first captured image of the plurality of captured images if the brightness/lighting data extracted from the first captured image satisfies a threshold criteria, but forgoes selecting a second captured image of the plurality of captured images if the second captured image fails to satisfy the threshold criteria.

After having been moved based on the path of movement from its location in FIG. 1B to its location in FIG. 1E, camera 104 of electronic device 100 is pointed by user 106, in FIG. 1E, towards the direction of object 118. While being pointed in the direction of object 118, electronic device 100 displays, in user interface 124, live-feed image 126 that includes object 118.

While displaying, in user interface 124, live-feed image 126 that includes object 118, electronic device 100 detects a request to measure a distance using the measure application (e.g., a distance between real-world points that correspond to points within an object shown in the live-feed image, such as object 118). In some embodiments, the request to measure the distance includes user selection of one or more points (e.g., two endpoints between which the distance is to be measured) within user interface 124 of the measure application that correspond to the real-world points, as described below with reference to FIGS. 1E-1F. In some embodiments, the request to measure the distance includes user selection of various icons (e.g., application icons), affordances, and/or controls.

In FIG. 1E, while displaying live-feed image 126 that includes object 118, electronic device 100 detects (e.g., via a touch-sensitive surface of the device) a user selection of a first selection point 128 in live-feed image 126 corresponding to a real-world first measurement point 130 of object 118 (e.g., a corner, an edge, a section, a piece of the object).

In response to detecting the user selection of first selection point 128 corresponding to first measurement point 130 of object 118, electronic device 100 sets (e.g., defines, designates) first measurement point 130 of object 118 as a first endpoint of a measurement. In some embodiments, in response to detecting the user selection of first selection point 128, electronic device 100 displays, in user interface 124, an indication 132 of the user selection of first selection point 128, as shown in FIG. 1F.

Figure 1F:
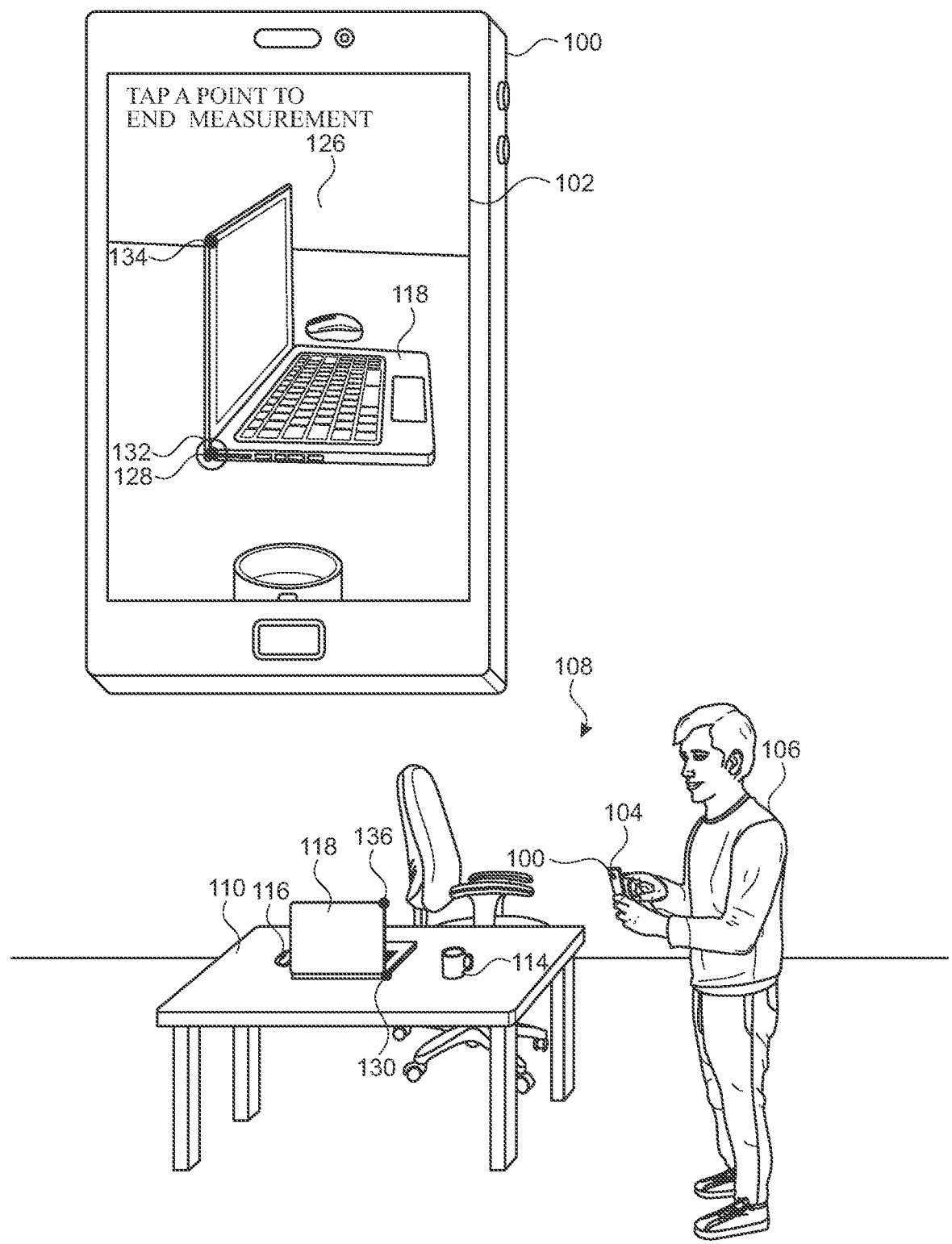

In FIG. 1F, while still displaying live-feed image 126 that includes object 118, electronic device 100 detects (e.g., via a touch-sensitive surface of the display) a user selection of a second selection point 134 in live-feed image 126 corresponding to another real-world second measurement point 136 of object 118 (e.g., a different corner, a different edge, a different section, a different piece of the object).

In response to detecting the user selection of second selection point 134 corresponding to second measurement point 136 of object 118, electronic device 100 sets (e.g., defines, designates) second measurement point 136 of object 118 as a second endpoint of the measurement. In some embodiments, in response to detecting the user selection of second selection point 134, electronic device 100 displays, in user interface 124, an indication 138 of the user selection of second selection point 134, as shown in FIG. 1G.

Figure 1G:
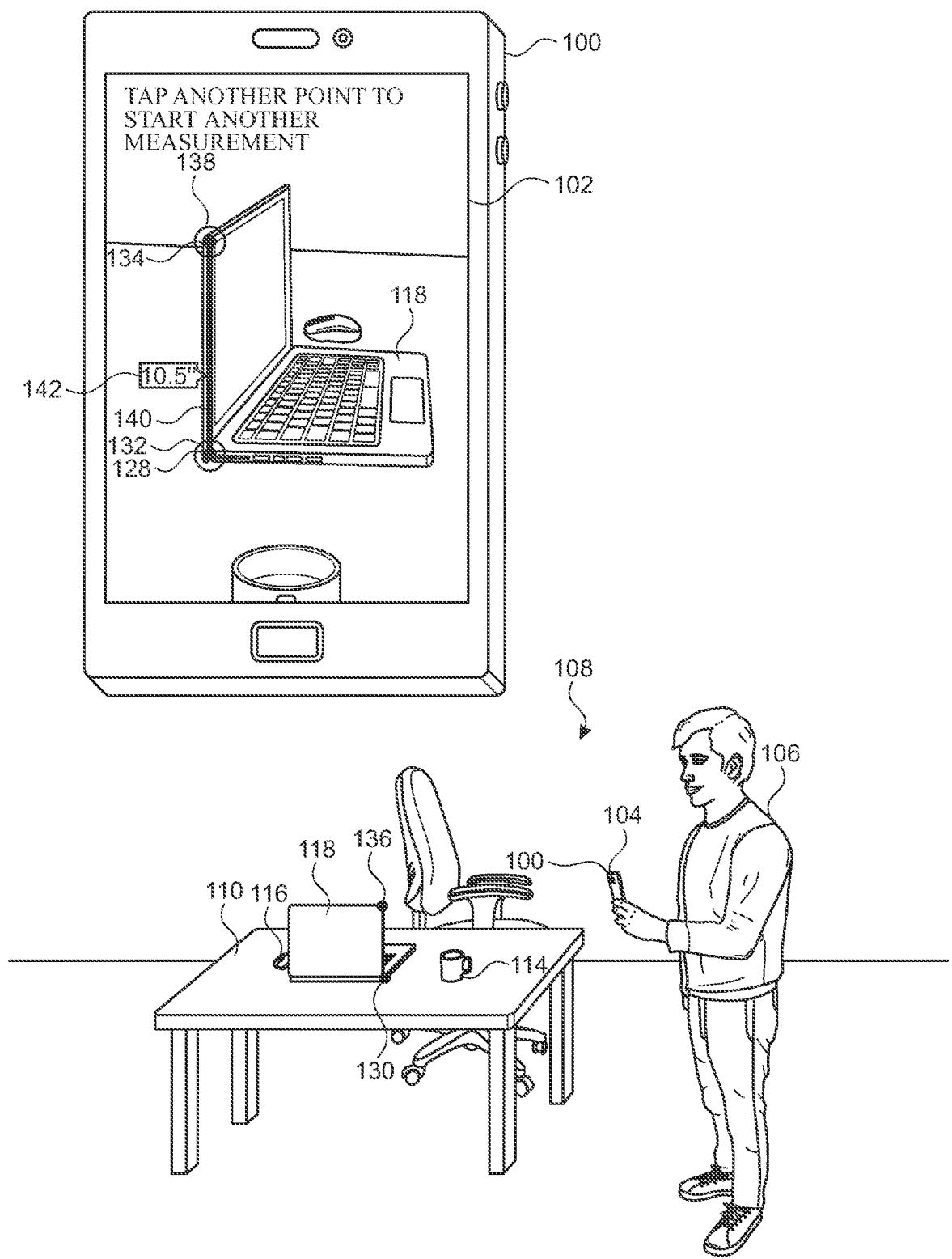

In FIG. 1G, in response to detecting the request to measure the distance (e.g., in response to detecting the user selection of first selection point 128 (corresponding to first measurement point 130 of object 118) and the user selection of second selection point 134 (corresponding to second measurement point 136 of object 118)), electronic device 100 determines (e.g., generates, calculates) a measurement (e.g., a real-world straight-line distance between first measurement point 130 and second measurement point 136 of object 118) corresponding to the first and second selection points using one or more of the stored keyframes. For example, if first measurement point 130 corresponds to a first corner of object 118 and second measurement point 136 corresponds to a second corner of object 118, where the two corners are connected by a straight edge, electronic device 100 provides the straight-line distance between first measurement point 130 and second measurement point 136 corresponding to the length of the edge. In some embodiments, electronic device 100 ceases capturing the plurality of images in response to detecting the request to measure the distance (e.g., in response to detecting the user selection of second selection point 134).

In some embodiments, electronic device 100 only uses keyframes from images that were captured by the device during the path of movement of the device between when the activation of the measure application was detected and when the request to measure the distance was detected on the device. In some embodiments, providing the measurement comprises displaying, in live-feed image 126, a representation 140 of the measurement between the selected portions of object 118, as shown in FIG. 1G, where representation 140 of the measurement includes a numerical value 142 of the measurement.

In some embodiments, determining the measurement corresponding to the selected portions of a real-world object (e.g., between first measurement point 130 and second measurement point 136 of object 118) using one or more of the stored keyframes involves combining a machine learning technique that is able to detect a real-world object (e.g., object 118) in the region of physical location 108 captured by the stored keyframes and a technique that extracts three-dimensional feature points of the real-world object using the keyframes (e.g., using pixel information extracted from the keyframes). In some embodiments, electronic device 100 then automatically determines (e.g., defines), using the extracted feature points of the object (e.g., object 118), a bounding volume for the object to determine a requested measurement. In some embodiments, tracking the placement of a measurement (e.g., the measurement between first measurement point 130 and second measurement point 136 of object 118) in a physical location of the real-world involves tracking the intersection of the requested measurement's view vector and a surface plane.

In some embodiments, electronic device 100 continues to automatically capture, via camera 104, a plurality of images after detecting user selection of one or more points for measurement (e.g., first selection point 128, second selection point 134) and determines new keyframes based on one or more characteristics of the captured images (e.g., to continuously update the stored keyframes in the memory buffer) . This continuous collection of real-world data enables electronic device 100 to refine, in real-time, the measurements to increase the accuracy of the measurements.

Figure 2A:
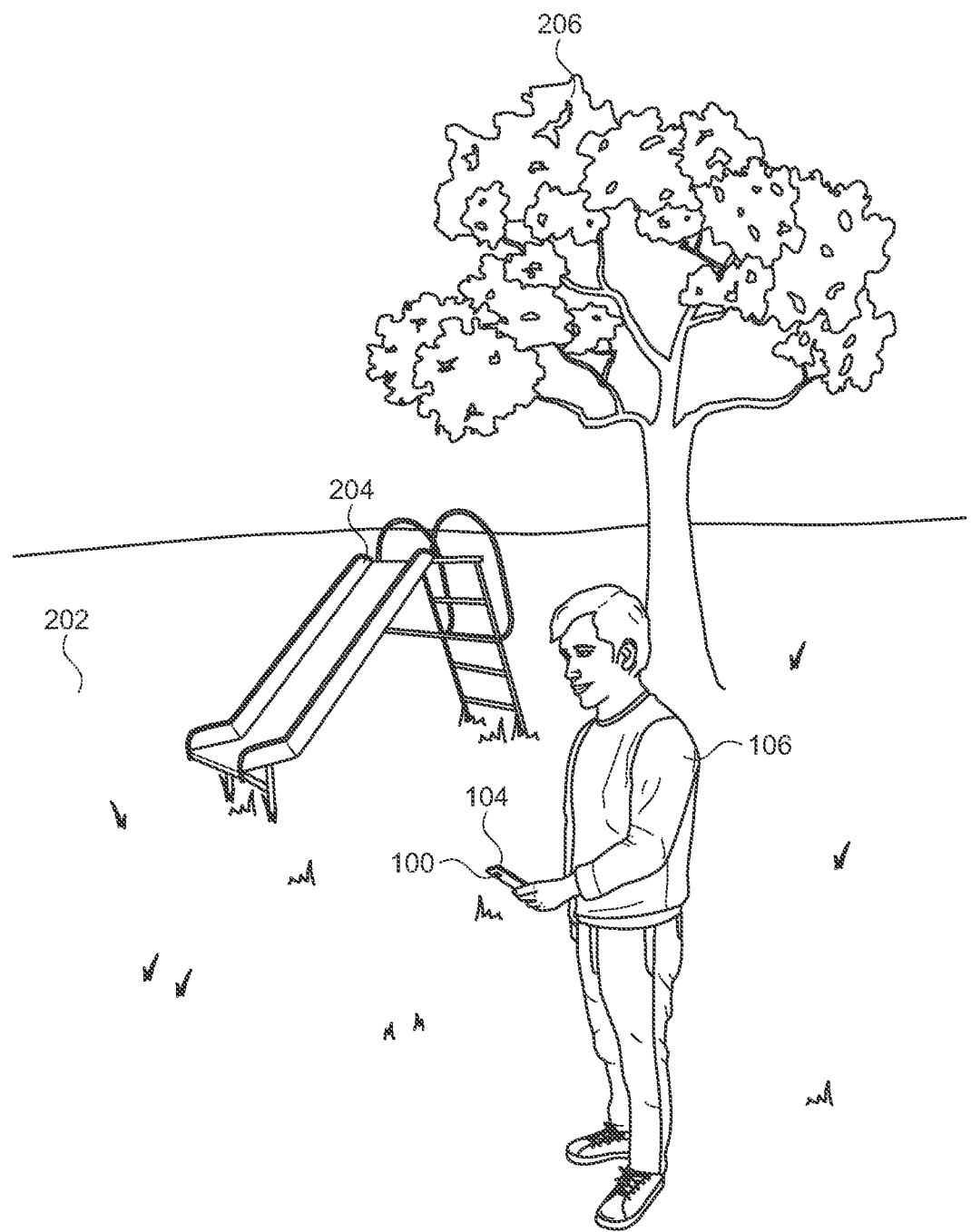

FIG. 2A illustrates a user 106 in a physical location 202 (e.g., an outdoor playground) holding electronic device 100. Physical location 202 includes a plurality of objects, including an object 204 (e.g., a slide) and an object 206 (e.g., a tree).

Figure 2B:
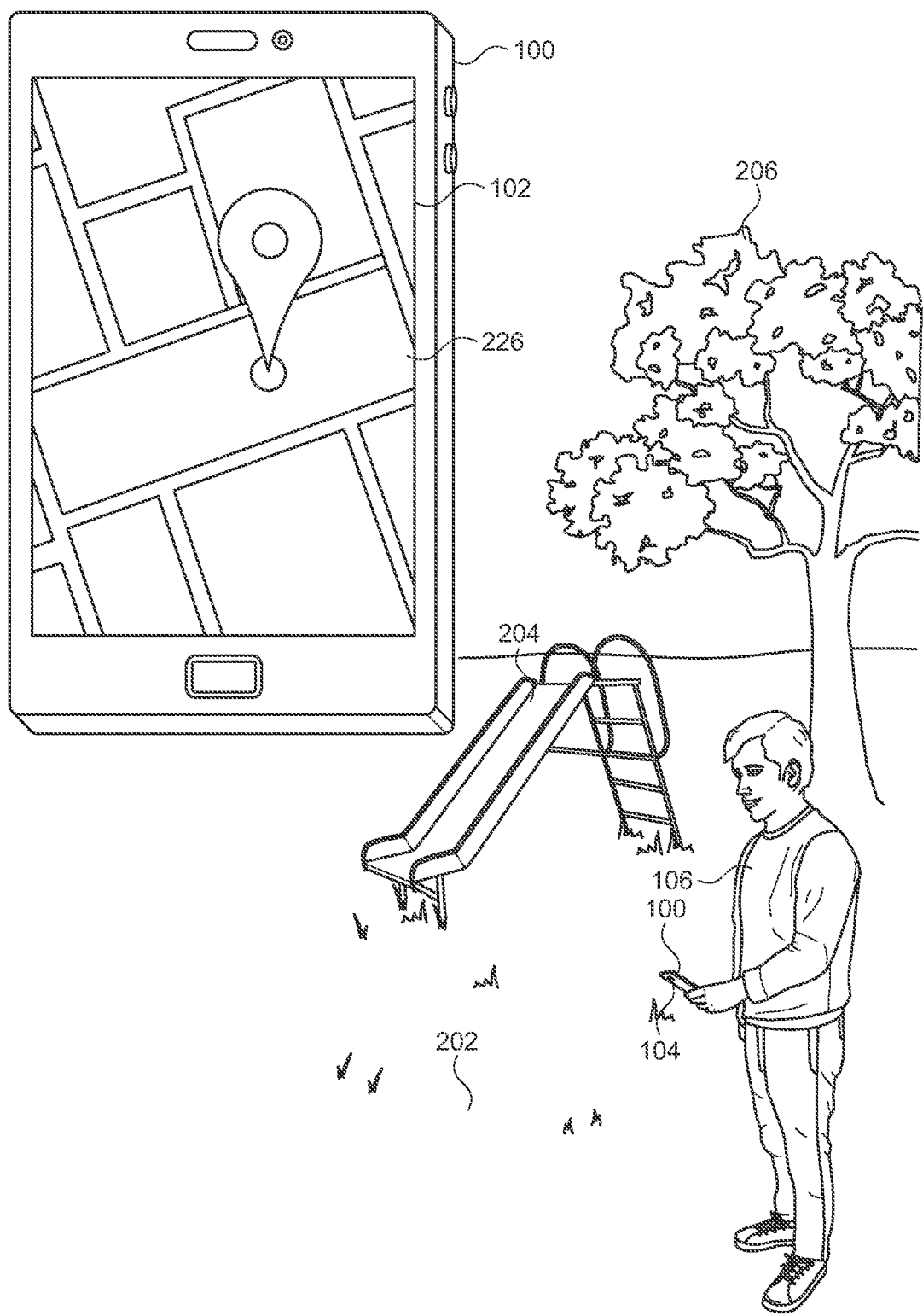
Figure 2C:
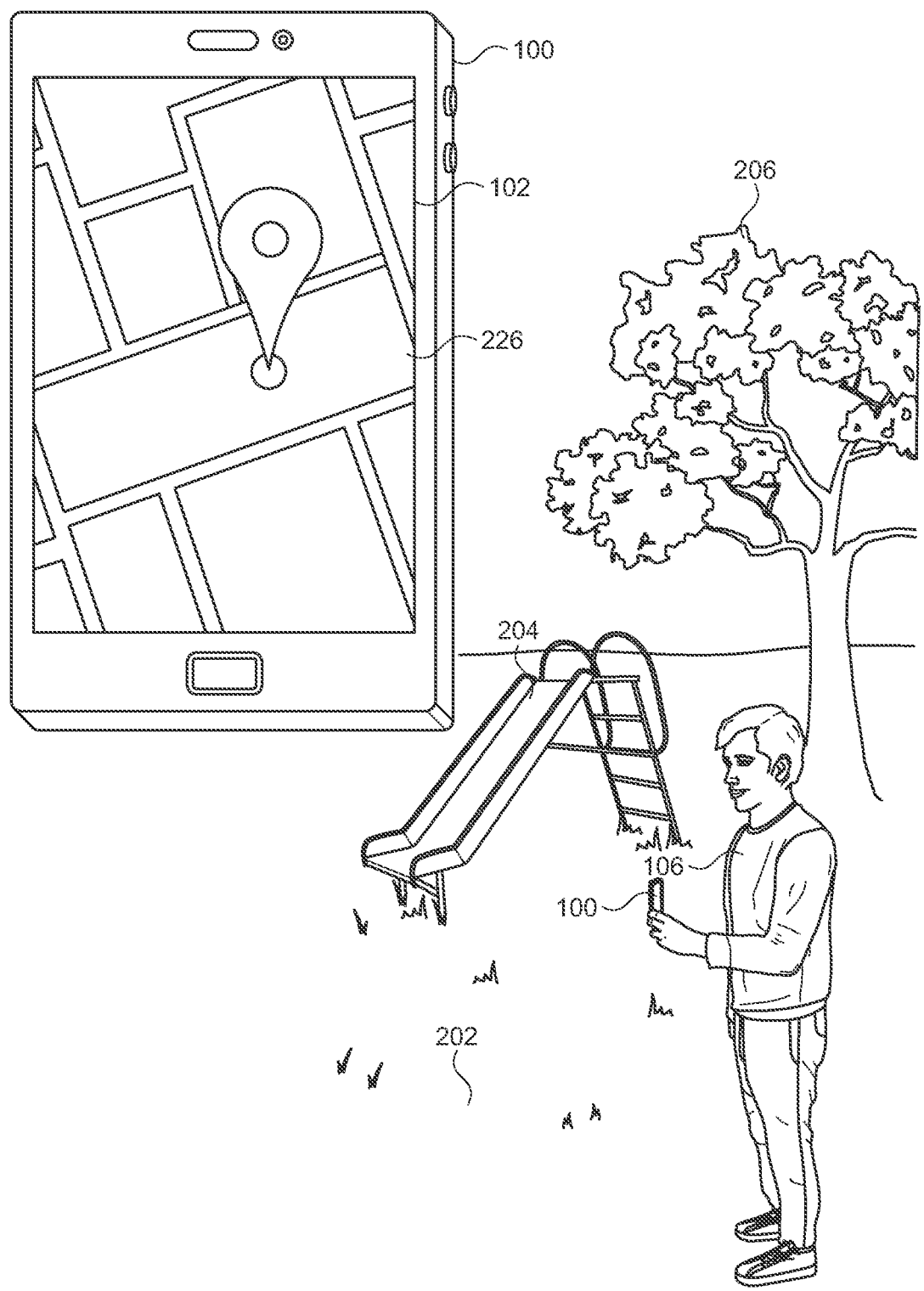
Figure 2D:
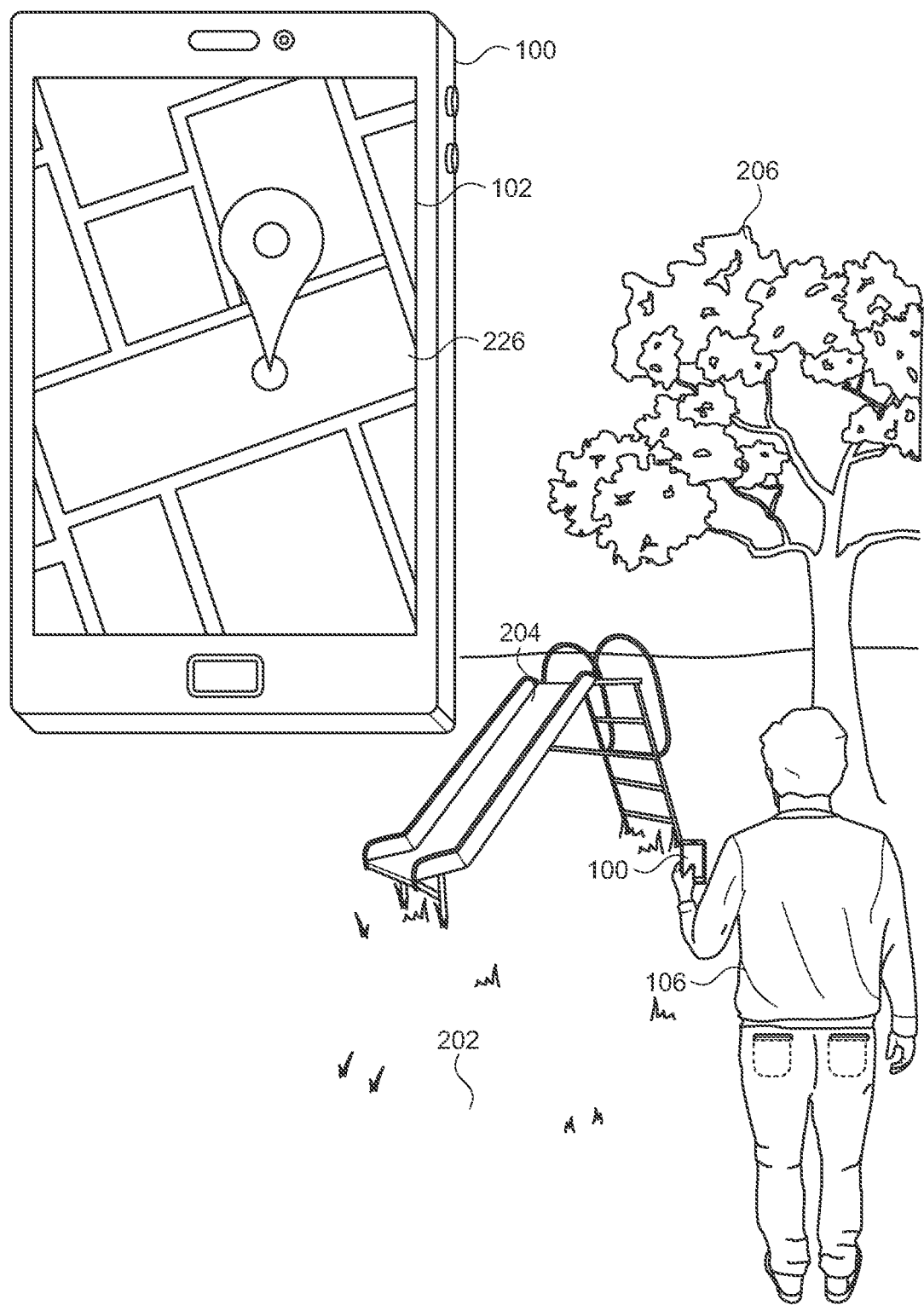

FIG. 2B illustrates electronic device 100 while user 106 is holding the device in a natural position. Electronic device 100 is displaying, on display 102, a user interface 226 of an application (e.g., a map application) that is active on the device, where the application corresponding to user interface 226 is not the measure application. In some embodiments, the application is a third-party application and not a first-party application.

In some embodiments, while displaying user interface 226 (e.g., of a map application), electronic device 100 detects a user input directed to navigating to a home user interface (e.g., home user interface 120) of the device (e.g., a user input on a home button of the device). In response to detecting the user input directed to navigating to the home user interface, electronic device 100 displays, on display 102, the home user interface (and ceases to display user interface 226). In some embodiments, while displaying the home user interface, electronic device 100 detects a user selection of an application icon (e.g., application icon 122B) corresponding to the measure application. In response to detecting the user selection of the application icon corresponding to the measure application on the home user interface, electronic device 100 activates the measure application by displaying, on display 102, user interface 124 of the measure application (and ceases to display the home user interface).

Alternatively, in some embodiments, as described in greater detail below with reference to FIGS. 2F-2G, while displaying user interface 226 (e.g., of a map application), electronic device 100 detects a user input directed to selecting a different application to view on the display. In some embodiments, in response to detecting the user input directed to selecting a different application to view on the display, electronic device 100 displays, on display 102, a plurality of user interface items corresponding to applications that are currently executing on the device, including a user interface item corresponding to user interface 226 (e.g., of a map application) and a user interface item corresponding to user interface 124 of the measure application (which has been executing on the device). In some embodiments, while displaying the plurality of user interface items, electronic device 100 detects a user selection of the user interface item corresponding to user interface 124 of the measure application. In response to detecting the user selection of the user interface item corresponding to user interface 124 of the measure application, electronic device 100 activates the measure application by displaying, on display 102, user interface 124 of the measure application (and ceases to display the plurality of user interface items).

In some embodiments, electronic device 100 captures, via camera 104, a plurality of images prior to detecting the activation of the measure application, as described with reference to FIGS. 2B-2E. In FIGS. 2B-2E, while electronic device 100 is displaying, on display 102, user interface 226 (e.g., of a map application), user 106 moves electronic device 100 from its location in the natural position (e.g., in FIG. 2B) to a different location (e.g., in FIG. 2E) where object 204 (e.g., a slide) is within the field-of-view of camera 104.

Figure 2E:
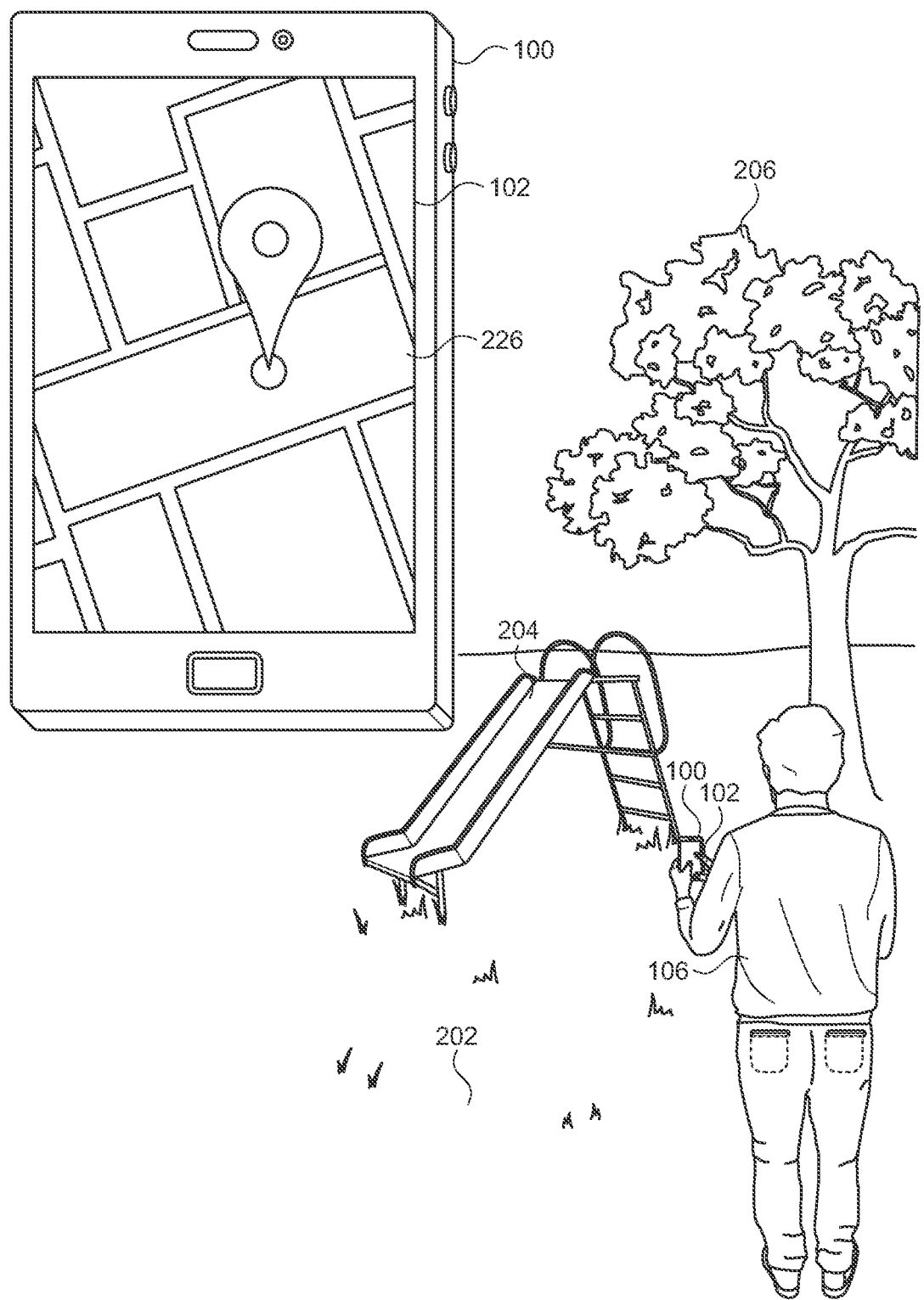
Figure 2F:
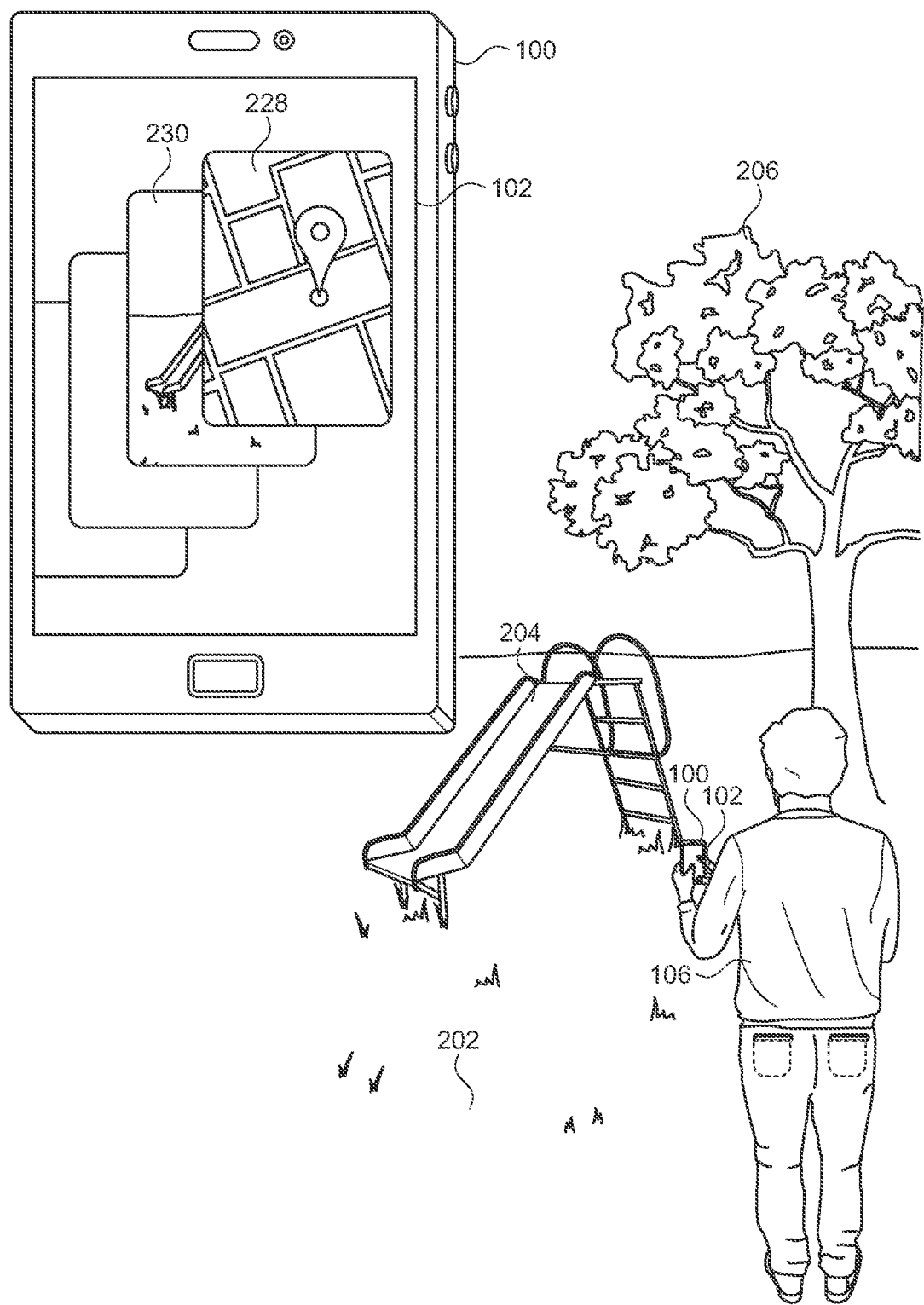

While electronic device 100 is being moved from its location in FIG. 2B to its location in FIG. 2E, the device automatically captures (e.g., without providing a feedback to the user such that it is not visible to the user whether the device is capturing), via camera 104, a plurality of images along the path of movement of the device. In some embodiments, electronic device 100 was automatically capturing the plurality of images prior to being positioned in its location in FIG. 2B. In some embodiments, electronic device 100 continues to automatically capture the plurality of images after being positioned in its location in FIG. 2E. In some embodiments, the measure application is opened/executed on the device (as a background application) while the device is being moved from its location in FIG. 2B to its location in FIG. 2E. In some embodiments, the measure application is closed on the device while the device is being moved from its location in FIG. 2B to its location in FIG. 2E; thus, in some embodiments, the plurality of images are captured without the measure application being opened/executing on the device.

As first described above with reference to FIGS. 1A-1G, in response to (e.g., and while) capturing the plurality of images, electronic device 100 determines (e.g., selects), based on one or more characteristics of the captured images, keyframes from the captured images (e.g., filters the captured images based on one or more characteristics of the images to determine/identify the keyframes) and stores (e.g., in a memory buffer) the keyframes (e.g., a predetermined number of keyframes). Examples of the one or more characteristics of the captured that are used to determine keyframes are described above with reference FIGS. 1A-1G, and, for the sake of simplicity, are not repeated herein.

In FIG. 2E, while displaying user interface 226 (e.g., of a map application), user 106 points camera 104 of electronic device 100 towards object 204. While displaying user interface 226, electronic device 100 detects a user input directed to selecting a different application to view on the display. As shown in FIG. 2F, in response to detecting the user input directed to selecting a different application to view on the display, electronic device 100 displays, on display 102, a plurality of user interface items corresponding to applications that are currently executing on the device, including a user interface item 228 corresponding to user interface 226 of the application (e.g., a map application) that was active in FIG. 2E and a user interface item 230 corresponding to user interface 124 of the measure application, which was and is executing on the device. While displaying the plurality of user interface items, electronic device detects a user selection of user interface item 228 corresponding to user interface 124 of the measure application, as shown in FIG. 2F.

Figure 2G:
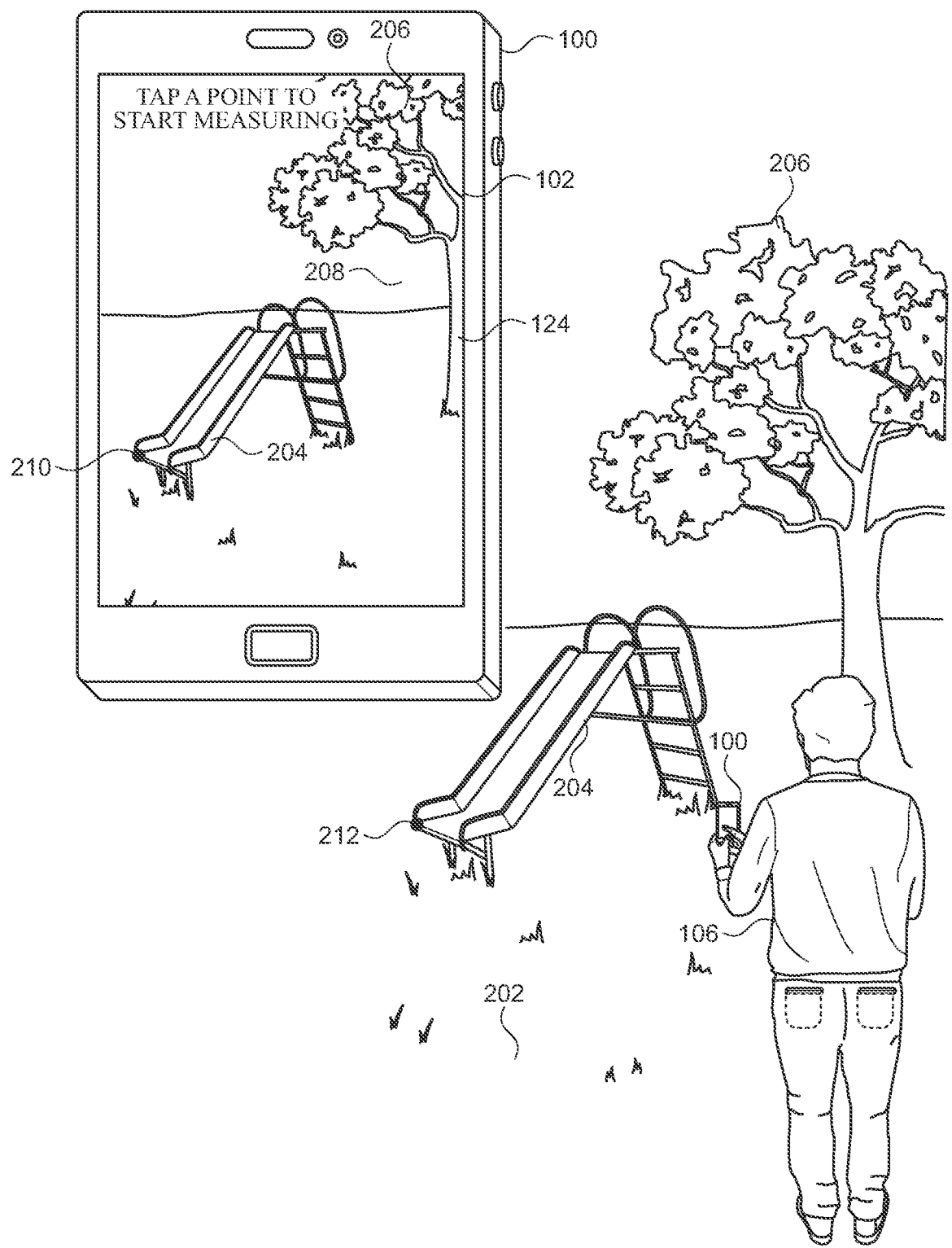

In FIG. 2G, in response to detecting the user selection of user interface 228 corresponding to the measure application, electronic device 100 activates the measure application by displaying, on display 102, user interface 124 of the measure application. As shown in FIG. 2G, user interface 124 includes display of a live-feed image 208 of the field-of-view of camera 104, where live-feed image includes object 204. In some embodiments, in response to detecting the activation of the measure application, and while displaying user interface 124 of the measure application, electronic device 100 continues to automatically capture the plurality of images.

While displaying, in user interface 124, live-feed image 208 that includes object 204, electronic device 100 detects a request to measure a distance using the measure application (e.g., a distance between real-world points that correspond to points within an object shown in the live-feed image, such as object 204). In some embodiments, the request to measure the distance comprises user selection of one or more points within user interface 124 that correspond to the real-world points, as first described above with reference to FIGS. 1E-1F and described again below with reference to FIGS. 2G-2H.

In FIG. 2G, while displaying live-feed image 208, electronic device 100 detects (e.g., via a touch-sensitive surface of the device) a user selection of a first selection point 210 in live-feed image 208 corresponding to a real-world first measurement point 212 of object 204 (e.g., a corner, an edge, a section, a piece of the object).

In response to detecting the user selection of first selection point 210 corresponding to first measurement point 212 of object 204, electronic device 100 sets (e.g., defines, designates) first measurement point 212 of object 204 as a first endpoint of a measurement. In some embodiments, in response to detecting the user selection of first selection point 210, electronic device 100 displays, in user interface 124, an indication 214 of the user selection of first selection point 210, as shown in FIG. 2H.

Figure 2H:
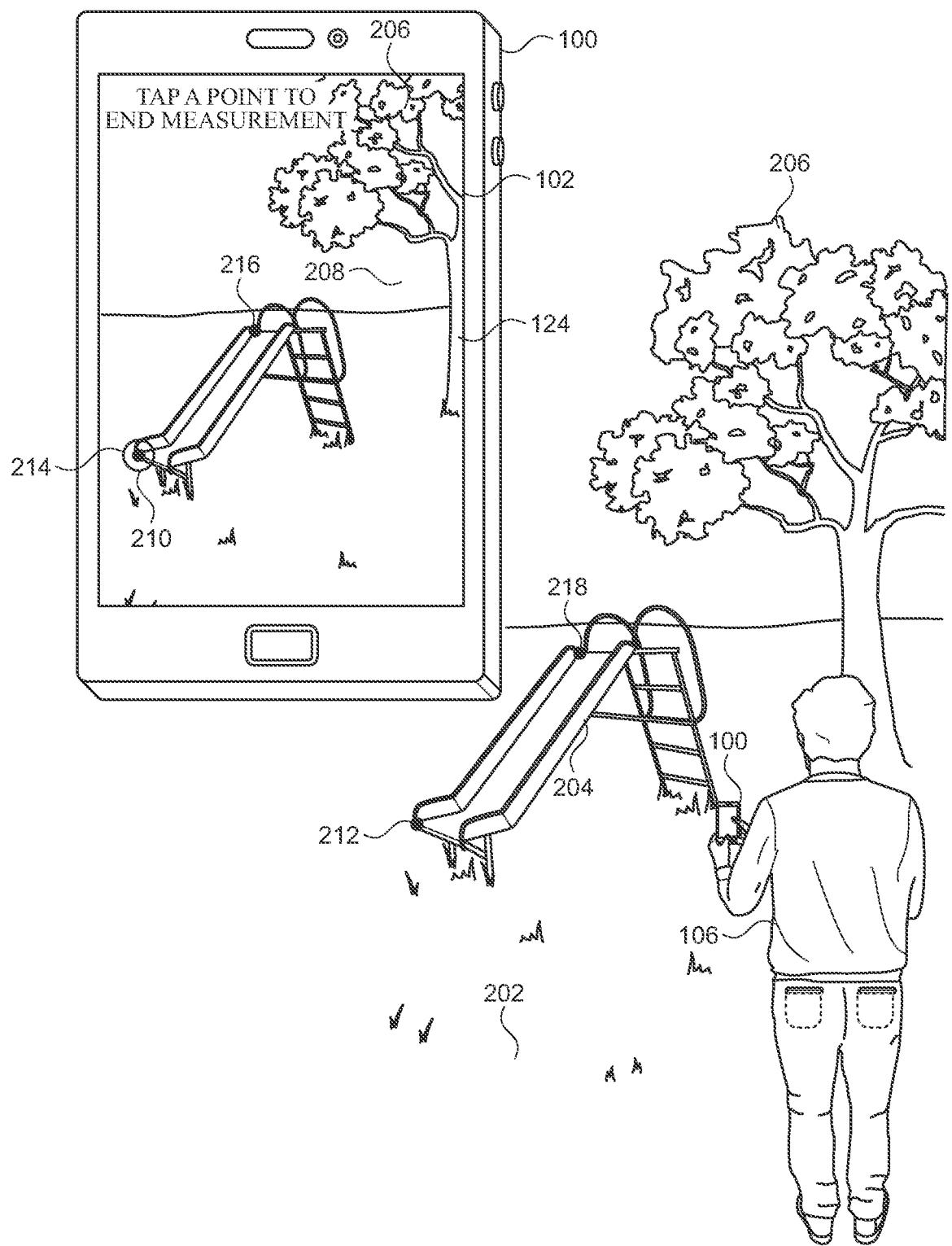
Figure 21:
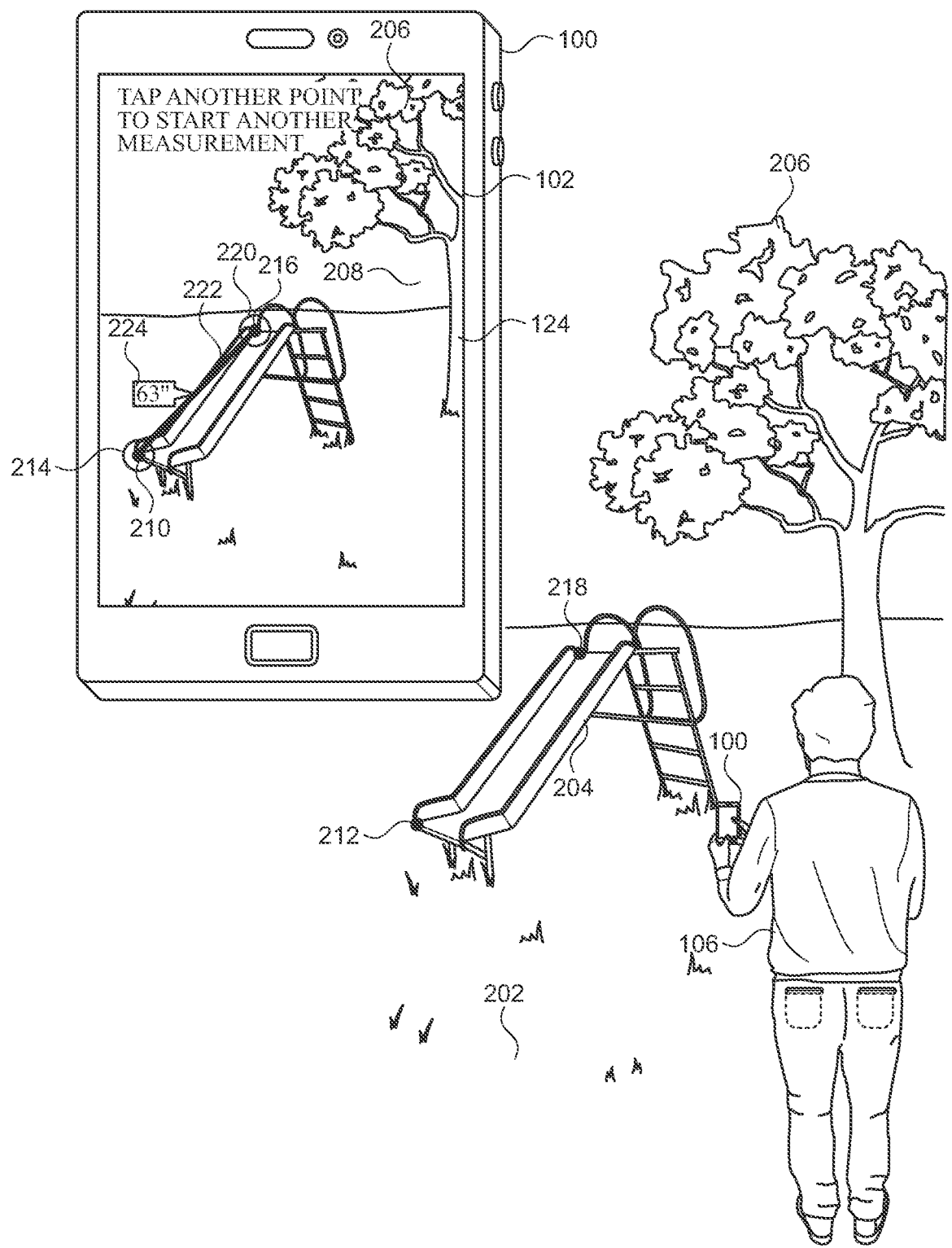

In FIG. 2H, while still displaying live-feed image 208 that includes object 204, electronic device 100 detects (e.g., via a touch-sensitive surface of the display) a user selection of a second selection point 216 in live-feed image 208 corresponding to a real-world second measurement point 218 of object 204 (e.g., a different corner, a different edge, a different section, a different piece of the object).

In response to detecting the user selection of second selection point 216 corresponding to second measurement point 218 of object 204, electronic device 100 sets (e.g., defines, designates) second measurement point 218 of object 204 as a second endpoint of the measurement. In some embodiments, in response to detecting the user selection of second selection point 216, electronic device 100 displays, in user interface 124, an indication 220 of the user selection of second selection point 216, as shown in FIG. 2I.

In FIG. 2I, in response to detecting the request to measure the distance (e.g., in response to detecting the user selection of first selection point 210 (corresponding to first measurement point 212 of object 204) and the user selection of second selection point 216 (corresponding to second measurement point 218 of object 204)), electronic device 100 determines (e.g., generates, calculates) a measurement (e.g., a real-world straight-line distance between first measurement point 212 and second measurement point 218 of object 204) corresponding to the first and second selection points using one or more of the stored keyframes. In other words, in some embodiments, electronic device 100 only uses keyframes from images that were captured by the device prior to detecting the request to measure the distance on the device. The use of stored keyframes to determine the measurement is described in greater detail above with reference to FIGS. 1A-1G and, for the sake of simplicity, is not repeated herein.

In response to determining the measurement corresponding to the first and second selection points, electronic device 100 provides the measurement. In some embodiments, providing the measurement comprises electronic device 100 displaying, in live-feed image 208, a representation 222 of the measurement between the selected portions of object 204, as shown in FIG. 2I, where representation 222 of the measurement includes a numerical value 224 of the measurement.

Figure 3A:
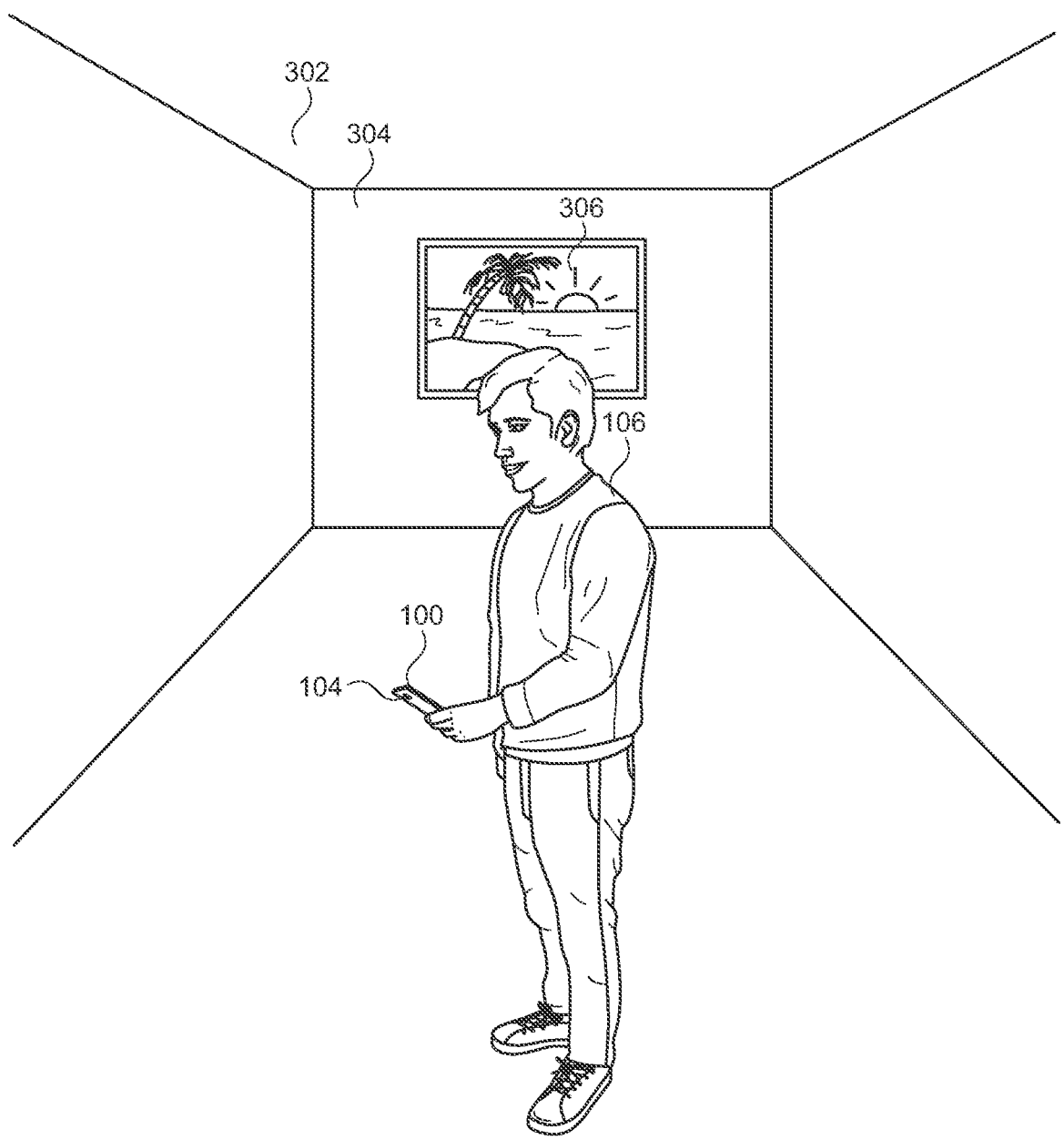
FIGS. 3A-3F illustrate another exemplary technique for enabling an electronic device to provide measurements, in accordance with some embodiments.

FIG. 3A illustrates user 106 at a physical location 302 (e.g., an indoor area, such as a room or hallway). Physical location 302 includes a wall 304 and an object 306 (e.g., a portrait) placed on wall 304. In FIG. 3A, user 106 is holding electronic device 100 (e.g., in a natural position such that the user can easily and comfortable view display 102 and navigate contents shown on display 102) while in physical location 302.

Figure 3B:
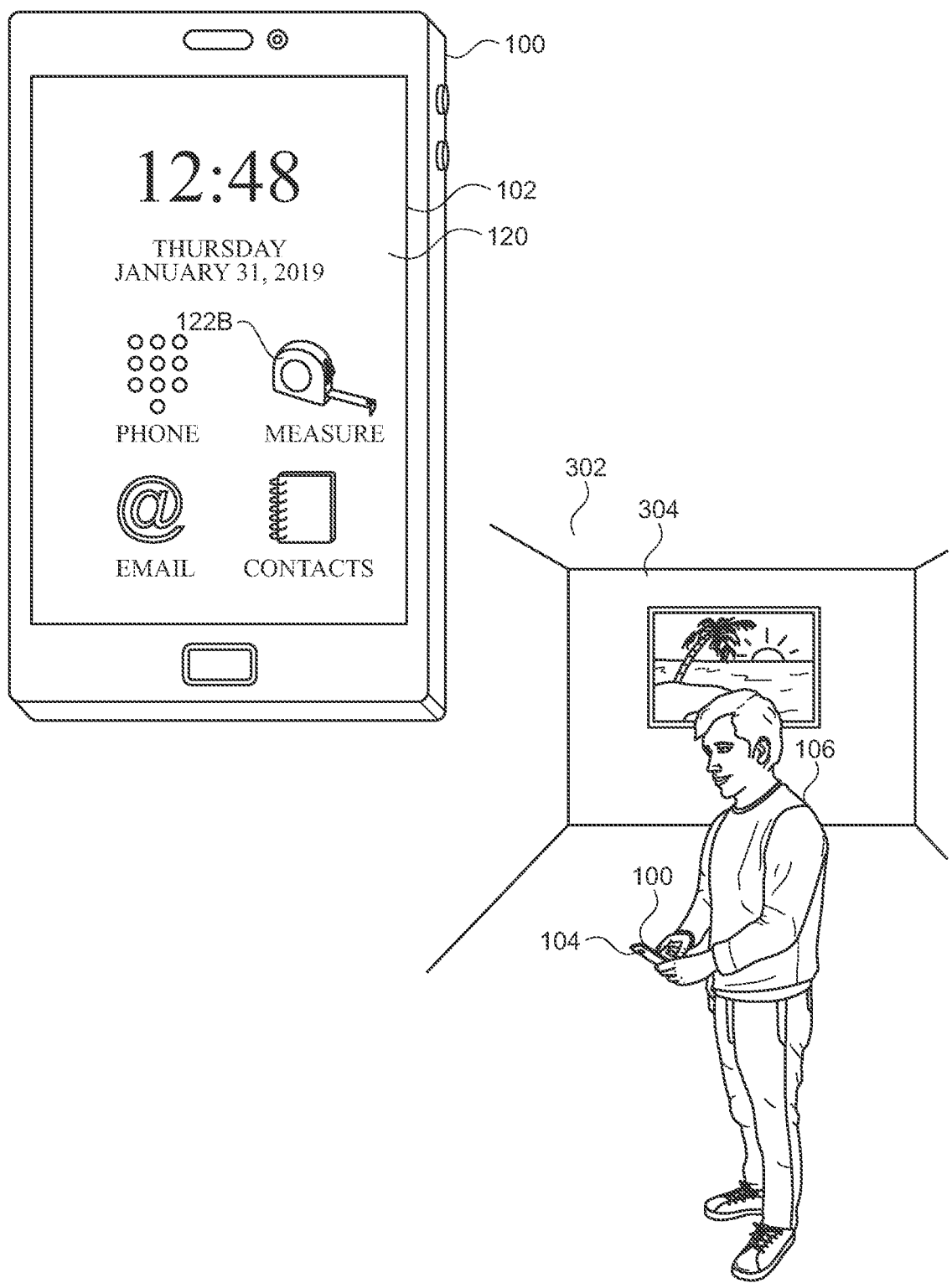

FIG. 3B illustrates electronic device 100 displaying, on display 102, user interface 120 while user 106 is in physical location 302 and holding the device in the natural position. In FIG. 3B, while displaying user interface 120, electronic device 100 detects (e.g., via a touch-sensitive display of the device) a user selection of application icon 122B corresponding to the measure application.

Figure 3C:
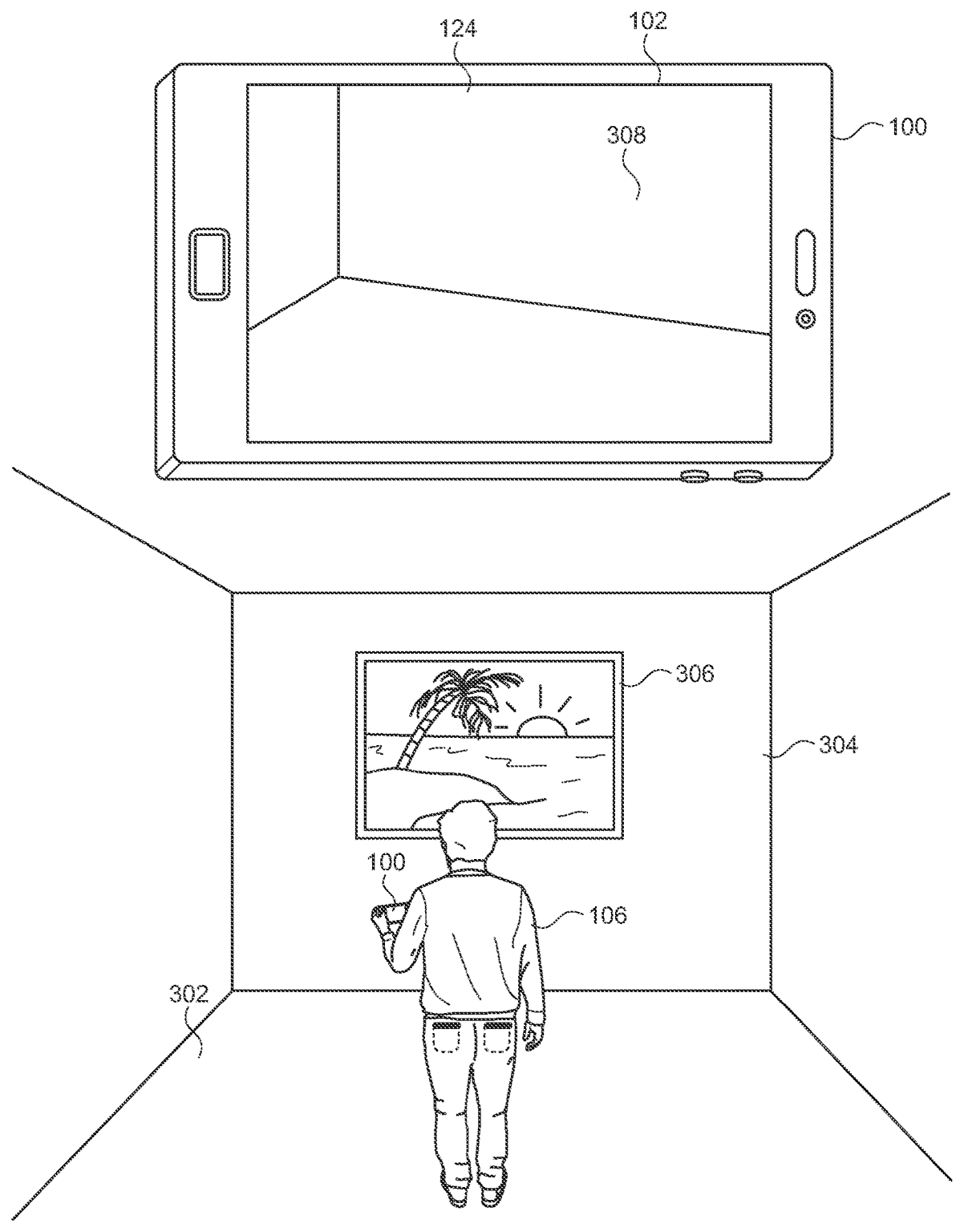

In FIG. 3C, in response to detecting the user selection of application icon 122B corresponding to the measure application, electronic device 100 activates the measure application by displaying, on display 102, user interface 124 of the measure application.

As shown in FIG. 3C, user interface 124 includes a live-feed image 308 of a region of physical location 302, where live-feed image 308 is being captured by camera 104 and corresponds to a region of physical location 302 that is within the field-of-view of camera 104. In some embodiments, in response to detecting the activation of the measure application, electronic device 100 begins automatically capturing (e.g., without providing a feedback to the user such that it is not visible to the user whether the device is capturing), via camera 104, a plurality of images of the region of physical location 302 that is within the field-of-view of camera 104.

Figure 3D:
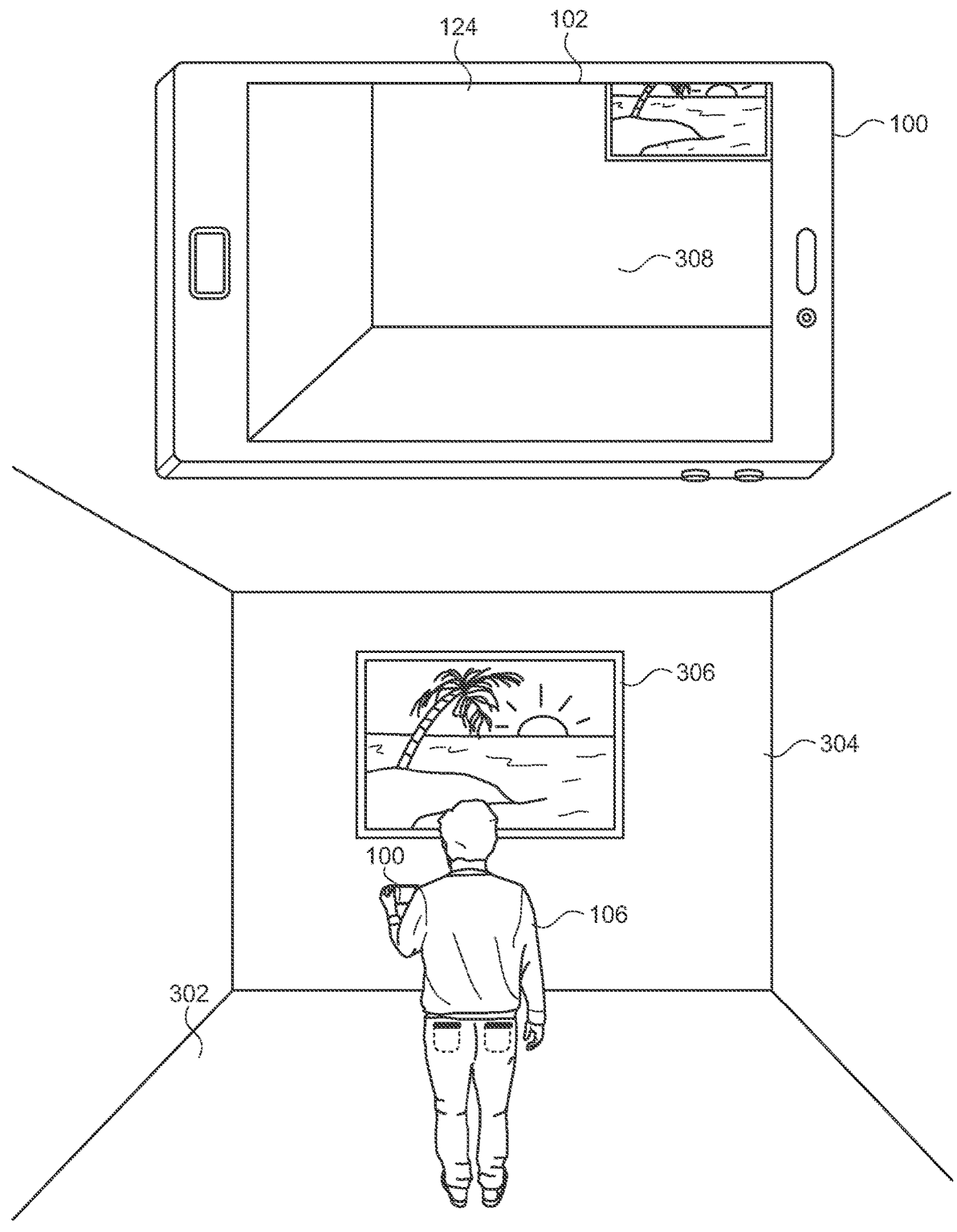
Figure 3E:
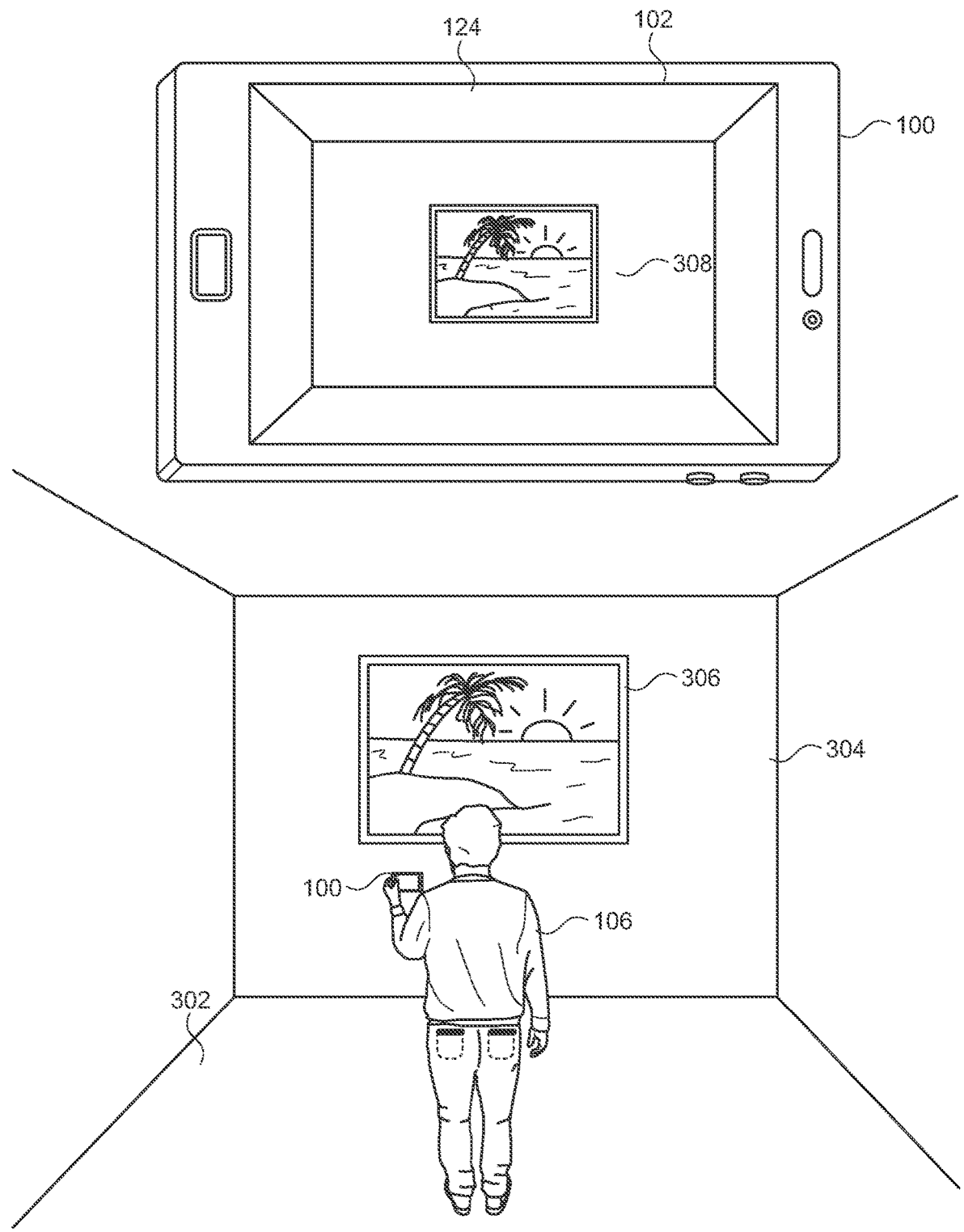

In FIGS. 3C-3E, user 106 moves electronic device 100 from its location in FIG. 3B (when the measure application was activated) to a location in FIG. 3E where wall 304 is within the field-of-view of camera 104 (e.g., fully within view of the field-of-view of the camera such that all four corners of the wall are visible within live-feed image 308). During the movement of electronic device 100 in FIGS. 3C-3E, electronic device 100 continues to automatically capture (e.g., without providing a feedback to the user such that it is not visible to the user whether the device is capturing), via camera 104, a plurality of images along the path of movement of the device as the device is moved from its location in FIG. 3B to its location in FIG. 3E by user 106.

As first described above with reference to FIGS. 1A-1G, during or after capturing the plurality of images along the path of movement of the device (e.g., the path of movement of the device in FIGS. 3C-3E), electronic device 100 determines (e.g., selects), based on one or more characteristics of the captured images, keyframes from the captured images (e.g., filters the captured images based on one or more characteristics of the images to determine/identify the keyframes) and stores (e.g., in a memory buffer) the keyframes (e.g., a predetermined number of keyframes). Examples of the one or more characteristics of the captured that are used to determine keyframes are described above with reference FIGS. 1A-1G, and, for the sake of simplicity, are not repeated herein.

After having followed the path of movement from its location in FIG. 3B to its location in FIG. 3E, camera 104 of electronic device 100 is pointed, by user 106, towards the direction of wall 304. In response, electronic device 100 displays, in user interface 124, live-feed image 308 that includes wall 304 (e.g., including all four sides of wall 304).

In some embodiments, in response to or upon detecting (e.g., using the machine learning technique that detects a real-world object within a physical location using three-dimensional feature points extracted from the stored keyframes) that wall 304 is within the field-of-view of camera 104 while the measure application is being displayed on display 102, electronic device 100 automatically determines one or more measurements corresponding to wall 304 (e.g., a layout of the dimensions of the wall, such as a horizontal length and vertical length of the wall; dimensions of object 306 hanging on the wall, such as a horizontal length and vertical length of object 306; a distance from an edge of wall 304 to an edge of object 306).

Figure 3F:
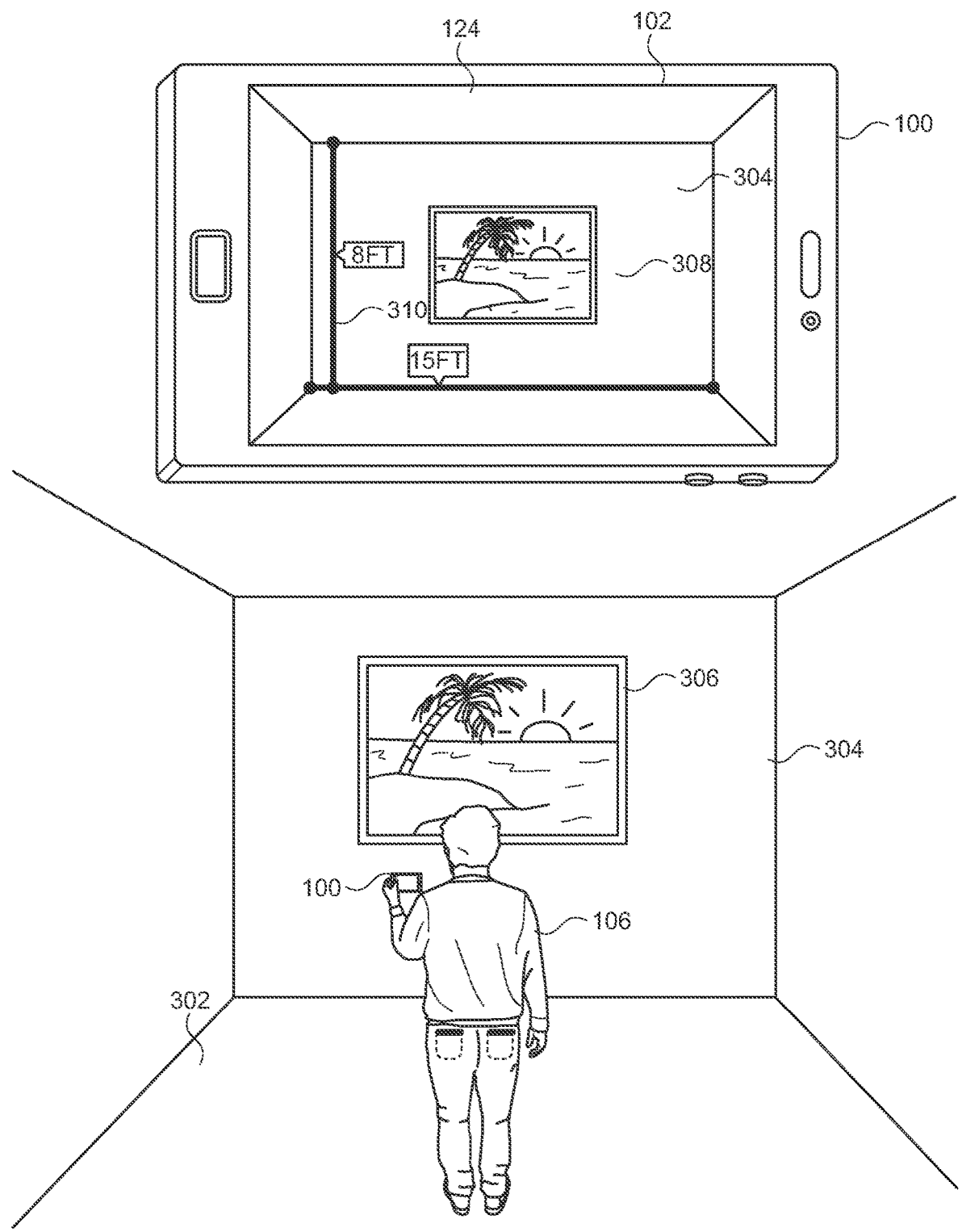

In some embodiments, electronic device 100 also automatically displays, in user interface 124, the one or more measurements corresponding to wall 304 (e.g., a measurement layout 310 of the wall), as shown in FIG. 3F. As described in greater detail above with reference to FIGS. 1A-1G, electronic device 100 determines one or more measurements corresponding to wall 304 using the stored keyframes that were captured during the path of movement of the device from its initial location in FIG. 3B (when the measure application was activated) to its current location in FIG. 3F (when the camera of the device is pointed towards the wall). Thus, in some embodiments, the measure application provides one or more measurements (e.g., upon detecting or determining the presence of an object) of an object without or prior to detecting a user request for a measurement or a user input specifically requesting a measurement.

Figure 4:
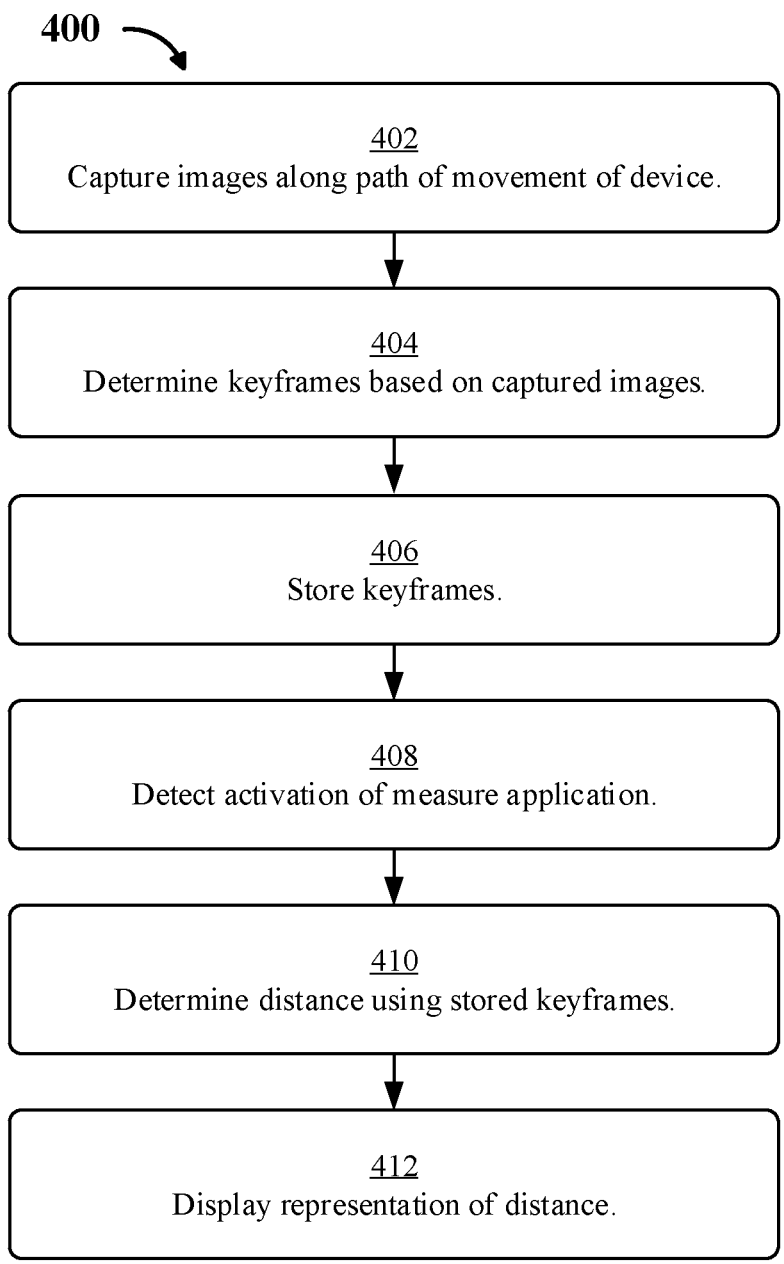
FIG. 4 is a flow diagram illustrating a method for enabling an electronic device to provide measurements, in accordance with some embodiments.

FIG. 4 is as flowchart illustrating a method for enabling an electronic device (e.g., 100) to provide measurements, in accordance with some embodiments. The electronic device has a camera (e.g., 104). In some embodiments, the electronic device also has a display (e.g., 102) and one or more input devices (e.g., a touch-sensitive surface).

Prior to detecting activation of an application (e.g., the measure application) for measuring a distance between real-world points (e.g., 130, 136, 212, 218) on the electronic device (e.g., 100), the electronic device captures (e.g., at block 402), via the camera (e.g., 104), a plurality of images along a path of movement of the electronic device. In some embodiments, the path of movement of the electronic device (e.g., 100) includes movement of the electronic device in an x-direction and a y-direction in a three-dimensional plane.

The electronic device (e.g., 100) determines (e.g., at block 404) keyframes based on one or more characteristics of the plurality of images. In some embodiments, determining the keyframes based on one or more characteristics of the plurality of images comprises the electronic device selecting, as the keyframes, one or more of the plurality of images based on the one or more characteristics.

In some embodiments, the one or more characteristics include an amount of movement of the electronic device (e.g., 100) between a location of the electronic device corresponding to a first image of the plurality of images and a location of the electronic device corresponding to a second image of the plurality of images. In some embodiments, the one or more characteristics include an image quality of a first image of the plurality of images. In some embodiments, the one or more characteristics include a brightness level of a first image of the plurality of images.

The electronic device (e.g., 100) stores (e.g., at block 406) the keyframes (e.g., in a memory buffer of the device).

In some embodiments, prior to detecting the activation of the application (e.g., the measure application), the electronic device (e.g., 100) determines feature points based on the keyframes, where the feature points identify an object (e.g. 118, 204, 304) captured in the keyframes, and where the real-world points (e.g., 130, 136, 212, 218) correspond to points on the object. In some embodiments, the electronic device determines the feature points based on the keyframes while determining the distance between the real-world points (e.g., in response to detecting the activation of the application).

In some embodiments, the electronic device (e.g., 100) detects (e.g., at block 408) the activation of the application (e.g., the measure application) for measuring the distance.

In response to detecting the activation of the application (e.g., the measure application) for measuring the distance, the electronic device (e.g., 100) determines (e.g., at block 410) the distance between real-world points (e.g., 130, 136, 212, 218) using one or more of the stored keyframes.

In response to detecting the activation of the application (e.g., the measure application) for measuring the distance, the electronic device (e.g., 100) displays (e.g., at block 412), in a user interface (e.g., 124) of the application, a representation (e.g., 140, 142, 222, 224, 310) of the distance.

In some embodiments, further in response to detecting the activation of the application (e.g., the measure application) for measuring the distance, the electronic device (e.g., 100) detects selection of a first measurement point (e.g., 128, 210) and a second measurement point (e.g., 134, 216) in the user interface (e.g., 124), where the first measurement point corresponds to a first real-world point (e.g., 130, 212) of the real-world points in a real-world environment and the second measurement point corresponds to a second real-world point (e.g., 136, 218) of the real-world points in the real-world environment, and where determining the distance between the real-world points comprises determining the distance between the first real-world point and the second real-world point.

In some embodiments, subsequent to determining the distance between the real-world points (e.g., 130, 136, 212, 218) using one or more of the stored keyframes, the electronic device (e.g., 100) captures, via the camera (e.g., 104), a second plurality of images along a second path of movement of the electronic device. In some embodiments, the electronic device determines new keyframes based on one or more characteristics of the second plurality of images. In some embodiments, the electronic device stores the new keyframes. In some embodiments, determines an updated distance between the real-world points using one or more of the stored new keyframes. In some embodiments, the electronic device displays, in the user interface (e.g., 124) of the application (e.g., the measure application), a representation of the updated distance.

Figure 5:
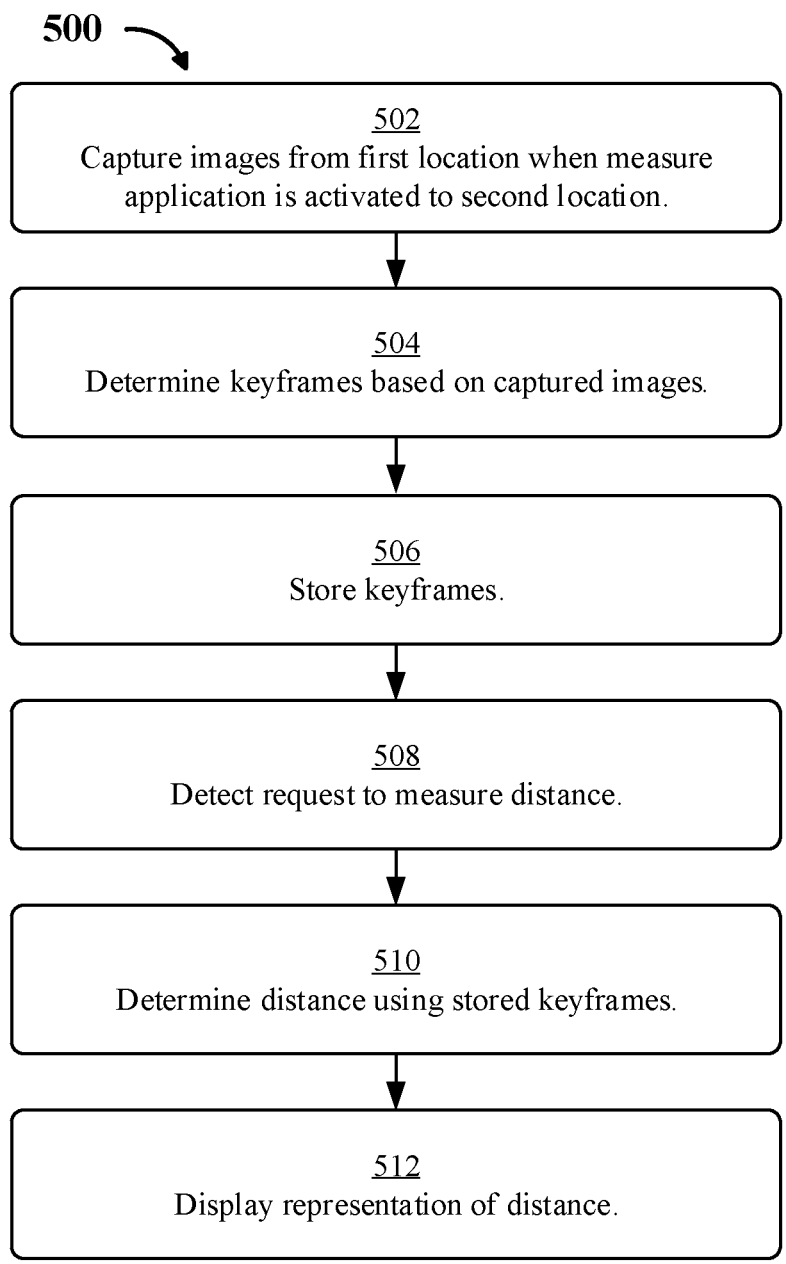
FIG. 5 is a flow diagram illustrating another method for enabling an electronic device to provide measurements, in accordance with some embodiments.

FIG. 5 is a flowchart illustrating another method for enabling an electronic device (e.g., 100) to provide measurements, in accordance with some embodiments. The electronic device has a camera (e.g., 104). In some embodiments, the electronic device also has a display (e.g., 102) and one or more input devices (e.g., a touch-sensitive surface).

Prior to detecting a request to measure a distance between real-world points (e.g., 130, 136, 212, 218) using an application (e.g., the measure application) on the electronic device (e.g., 100), the electronic device captures (e.g., at block 502), via the camera (e.g., 104), a plurality of images along a path of movement of the electronic device from a first location to a second location, where the first location corresponds to a location of the electronic device when the application is activated on the electronic device (thereby causing the device to display a user interface (e.g., 124) of the application).

In some embodiments, the second location corresponds to a location of the electronic device (e.g., 100) when the request to measure the distance is detected on the electronic device. In some embodiments, the path of movement of the electronic device (e.g., 100) from the first location to the second location includes movement of the electronic device in an x-direction and a y-direction in a three-dimensional plane.

In some embodiments, the electronic device (e.g., 100) displays a second user interface (e.g., 120) that does not correspond to the application (e.g., the measure application) when the application is not activated on the electronic device. In some embodiments, the electronic device displays the user interface (e.g., 124) of the application when the application is activated on the electronic device.

The electronic device (e.g., 100) determines (e.g., at block 504) keyframes based on one or more characteristics of the plurality of images. In some embodiments, determining the keyframes based on one or more characteristics of the plurality of images comprises the electronic device selecting, as the keyframes, one or more of the plurality of images based on the one or more characteristics.

In some embodiments, the one or more characteristics include an amount of movement of the electronic device (e.g., 100) between a location of the electronic device corresponding to a first image of the plurality of images and a location of the electronic device corresponding to a second image of the plurality of images. In some embodiments, the one or more characteristics include an image quality of a first image of the plurality of images. In some embodiments, the one or more characteristics include a brightness level of a first image of the plurality of images.

The electronic device (e.g., 100) stores (e.g., at block 506) the keyframes (e.g., in a memory buffer of the device).

In some embodiments, prior to detecting the request to measure the distance, the electronic device (e.g., 100) determines feature points based on the keyframes, where the feature points identify a real-world object (e.g., 118, 204, 304) captured in the keyframes, and where the real-world points (e.g., 130, 136, 212, 218) correspond to points on the real-world object.

In some embodiments, the electronic device (e.g., 100) detects (e.g., at block 508) the request to measure the distance. In some embodiments, detecting the request to measure the distance comprises the electronic device detecting selection of a measurement point (e.g., a first measurement point and a second measurement point) in the user interface of the application (e.g., the measure application), where the measurement point in the user interface (e.g., 124) corresponds to a first real-world point (e.g., 130, 136, 212, 218) of the real-world points in a real-world environment (e.g., 108, 202, 302).

In response to detecting the request to measure the distance, the electronic device (e.g., 100) determines (e.g., at block 510) the distance between the real-world points (e.g., 130, 136, 212, 218) using one or more of the stored keyframes.

In response to detecting the request to measure the distance, the electronic device (e.g., 100) displays (e.g., at block 512), in a user interface (e.g., 124) of the application (e.g., the measure application), a representation (e.g., 140, 142, 222, 224, 310) of the distance.

In some embodiments, subsequent to determining the distance between the real-world points (e.g., 130, 136, 212, 218) using one or more of the stored keyframes, the electronic device (e.g., 100) captures, via the camera (e.g., 104), a second plurality of images along a second path of movement of the electronic device. In some embodiments, the electronic device determines new keyframes based on one or more characteristics of the second plurality of images. In some embodiments, the electronic device stores the new keyframes. In some embodiments, the electronic device determines an updated distance between the real-world points using one or more of the stored new keyframes. In some embodiments, the electronic device displays, in the user interface (e.g., 124) of the application (e.g., the measure application), a representation of the updated distance.

The foregoing description, for purpose of explanation, has been described with reference to specific embodiments. However, the illustrative discussions above are not intended to be exhaustive or to limit the invention to the precise forms disclosed. For example, a wearable device could be a smart watch, an ear piece, a pair of glasses, among other examples. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of image data to provide measurements using an application on the electronic device. Entities implementing these features should take care to distinguish between the image processing that is occurring on-device, against information that is transmitted beyond the device. The present disclosure contemplates that measurement information can be provided using local processing, meaning that images that are taken of a user's nearby environment are not transmitted by the device to a remote server.

To the extent that entities implementing the foregoing techniques choose to transmit images taken by a device as part of a measurement activity beyond the device, such entities should proactive inform its users of the possible data transfer and users to select to "opt in" or "opt out" of enabling the device to capture and/or process image data when the relevant application (e.g., the measure application) is not active.

Therefore, although the present disclosure broadly covers use of using camera images for measurement activities, the present disclosure also contemplates that the captured images are ephemeral in nature.

What is claimed is:

1. An electronic device, comprising:
   a camera;
   one or more processors; and
   a memory storing one or more programs configured to be executed by the one or more processors,
   the one or more programs including instructions for:
   prior to detecting a request to measure a distance between real-world points using an application on the electronic device:
   displaying a second user interface that does not correspond to the application when the application is not activated on the electronic device;
   displaying a user interface of the application instead of the second user interface when the application is activated on the electronic device;
   capturing, via the camera, a plurality of images along a path of movement of the electronic device from a first location to a second location, wherein the first location corresponds to a location of the electronic device when the application is activated on the electronic device;
   determining keyframes based on one or more characteristics of the plurality of images; and
   storing the keyframes; and
   in response to detecting the request to measure the distance:
   determining the distance between the real-world points using one or more of the stored keyframes; and
   displaying, in the user interface of the application, a representation of the distance.

2. The electronic device of claim 1, wherein the second location corresponds to a location of the electronic device when the request to measure the distance is detected on the electronic device.

3. The electronic device of claim 1, wherein detecting the request to measure the distance comprises detecting selection of a measurement point in the user interface of the application, wherein the measurement point in the user interface corresponds to a first real-world point of the real-world points in a real-world environment.

4. The electronic device of claim 1, wherein determining the keyframes based on one or more characteristics of the plurality of images comprises selecting, as the keyframes, one or more of the plurality of images based on the one or more characteristics.

5. The electronic device of claim 1, wherein the one or more characteristics include an amount of movement of the electronic device between a location of the electronic device corresponding to a first image of the plurality of images and a location of the electronic device corresponding to a second image of the plurality of images.

6. The electronic device of claim 1, wherein the one or more characteristics include an image quality of a first image of the plurality of images.

7. The electronic device of claim 1, wherein the one or more characteristics include a brightness level of a first image of the plurality of images.

8. The electronic device of claim 1, the one or more programs further including instructions for:
    determining feature points based on the keyframes, wherein the feature points identify a real-world object captured in the keyframes, and wherein the real-world points correspond to points on the real-world object.

9. The electronic device of claim 1, wherein the path of movement of the electronic device from the first location to the second location includes movement of the electronic device in an x-direction and a y-direction in a three-dimensional plane.

10. The electronic device of claim 1, the one or more programs further including instructions for:
    subsequent to determining the distance between the real-world points using one or more of the stored keyframes, capturing, via the camera, a second plurality of images along a second path of movement of the electronic device;
    determining new keyframes based on one or more characteristics of the second plurality of images;
    storing the new keyframes;
    determining an updated distance between the real-world points using one or more of the stored new keyframes; and
    displaying, in the user interface of the application, a representation of the updated distance.

11. A method, comprising:
    at an electronic device with a camera:
        prior to detecting a request to measure a distance between real-world points using an application on the electronic device:
            displaying a second user interface that does not correspond to the application when the application is not activated on the electronic device;
            displaying a user interface of the application instead of the second user interface when the application is activated on the electronic device; and
            capturing, via the camera, a plurality of images along a path of movement of the electronic device from a first location to a second location, wherein the first location corresponds to a location of the electronic device when the application is activated on the electronic device;
            determining keyframes based on one or more characteristics of the plurality of images; and
            storing the keyframes; and
        in response to detecting the request to measure the distance:
            determining the distance between the real-world points using one or more of the stored keyframes; and
            displaying, in the user interface of the application, a representation of the distance.

12. A non-transitory computer-readable storage medium storing one or more programs configured to be executed by one or more processors of an electronic device with a camera, the one or more programs including instructions for:
    prior to detecting a request to measure a distance between real-world points using an application on the electronic device:
        displaying a second user interface that does not correspond to the application when the application is not activated on the electronic device;
        displaying a user interface of the application instead of the second user interface when the application is activated on the electronic device; and
        capturing, via the camera, a plurality of images along a path of movement of the electronic device from a first location to a second location, wherein the first location corresponds to a location of the electronic device when the application is activated on the electronic device;
        determining keyframes based on one or more characteristics of the plurality of images; and
        storing the keyframes; and
    in response to detecting the request to measure the distance:
        determining the distance between the real-world points using one or more of the stored keyframes; and
        displaying, in a user interface of the application, a representation of the distance;
    in response to detecting the request to measure the distance:
        determining the distance between the real-world points using one or more of the stored keyframes; and
        displaying, in the user interface of the application, a representation of the distance.

13. The method of claim 11, wherein the second location corresponds to a location of the electronic device when the request to measure the distance is detected on the electronic device.

14. The method of claim 11, wherein detecting the request to measure the distance comprises detecting selection of a measurement point in the user interface of the application, wherein the measurement point in the user interface corresponds to a first real-world point of the real-world points in a real-world environment.

15. The method of claim 11, wherein determining the keyframes based on one or more characteristics of the plurality of images comprises selecting, as the keyframes, one or more of the plurality of images based on the one or more characteristics.

16. The method of claim 11, wherein the one or more characteristics include an amount of movement of the electronic device between a location of the electronic device corresponding to a first image of the plurality of images and a location of the electronic device corresponding to a second image of the plurality of images.

17. The method of claim 11, wherein the one or more characteristics include an image quality of a first image of the plurality of images.

18. The method of claim 11, wherein the one or more characteristics include a brightness level of a first image of the plurality of images.

19. The method of claim 11, further comprising:
    determining feature points based on the keyframes, wherein the feature points identify a real-world object captured in the keyframes, and wherein the real-world points correspond to points on the real-world object.

20. The method of claim 11, wherein the path of movement of the electronic device from the first location to the second location includes movement of the electronic device in an x-direction and a y-direction in a three-dimensional plane.

21. The method of claim 11, further comprising:
subsequent to determining the distance between the real-world points using one or more of the stored keyframes, capturing, via the camera, a second plurality of images along a second path of movement of the electronic device;
determining new keyframes based on one or more characteristics of the second plurality of images;
storing the new keyframes;
determining an updated distance between the real-world points using one or more of the stored new keyframes; and
displaying, in the user interface of the application, a representation of the updated distance.

22. The non-transitory computer-readable storage medium of claim 12, wherein the second location corresponds to a location of the electronic device when the request to measure the distance is detected on the electronic device.

23. The non-transitory computer-readable storage medium of claim 12, wherein detecting the request to measure the distance comprises detecting selection of a measurement point in the user interface of the application, wherein the measurement point in the user interface corresponds to a first real-world point of the real-world points in a real-world environment.

24. The non-transitory computer-readable storage medium of claim 12, wherein determining the keyframes based on one or more characteristics of the plurality of images comprises selecting, as the keyframes, one or more of the plurality of images based on the one or more characteristics.

25. The non-transitory computer-readable storage medium of claim 12, wherein the one or more characteristics include an amount of movement of the electronic device between a location of the electronic device corresponding to a first image of the plurality of images and a location of the electronic device corresponding to a second image of the plurality of images.

26. The non-transitory computer-readable storage medium of claim 12, wherein the one or more characteristics include an image quality of a first image of the plurality of images.

27. The non-transitory computer-readable storage medium of claim 12, wherein the one or more characteristics include a brightness level of a first image of the plurality of images.

28. The non-transitory computer-readable storage medium of claim 12, the one or more programs further including instructions for:
determining feature points based on the keyframes, wherein the feature points identify a real-world object captured in the keyframes, and wherein the real-world points correspond to points on the real-world object.

29. The non-transitory computer-readable storage medium of claim 12, wherein the path of movement of the electronic device from the first location to the second location includes movement of the electronic device in an x-direction and a y-direction in a three-dimensional plane.

30. The non-transitory computer-readable storage medium of claim 12, the one or more programs further including instructions for:
subsequent to determining the distance between the real-world points using one or more of the stored keyframes, capturing, via the camera, a second plurality of images along a second path of movement of the electronic device;
determining new keyframes based on one or more characteristics of the second plurality of images;
storing the new keyframes;
determining an updated distance between the real-world points using one or more of the stored new keyframes; and
displaying, in the user interface of the application, a representation of the updated distance.

* * * * *